United States Patent
Nakamori

(10) Patent No.: US 11,449,701 B2
(45) Date of Patent: Sep. 20, 2022

(54) NON-TRANSITORY COMPUTER READABLE MEDIUM STORING IMAGE PROCESSING PROGRAM, IMAGE PROCESSING APPARATUS, AND NON-TRANSITORY COMPUTER READABLE MEDIUM STORING PROGRAM

(71) Applicant: FUJIFILM Business Innovation Corp., Tokyo (JP)

(72) Inventor: Yuki Nakamori, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 100 days.

(21) Appl. No.: 16/572,576

(22) Filed: Sep. 16, 2019

(65) Prior Publication Data
US 2020/0097760 A1    Mar. 26, 2020

(30) Foreign Application Priority Data
Sep. 25, 2018 (JP) .............................. JP2018-179445

(51) Int. Cl.
*G06K 9/62* (2022.01)
*G06V 10/40* (2022.01)

(52) U.S. Cl.
CPC ........... *G06K 9/6215* (2013.01); *G06V 10/40* (2022.01)

(58) Field of Classification Search
CPC ...... G06K 9/6215; G06K 9/46; G06K 9/3233; G06K 9/6253; G06K 9/36; G06K 9/00268; G06F 3/0485; G06F 3/04845; G06F 3/04883; G06F 2203/04806; G06T 11/60; H04N 5/262; H04N 5/23229; H04N 5/2628; H04N 1/00244; H04N 1/00251; H04L 67/06
See application file for complete search history.

(56) References Cited

U.S. PATENT DOCUMENTS

| 9,280,564 B2 | 3/2016 | Honda |
| 2003/0090690 A1 | 5/2003 | Katayama et al. |
| 2012/0229664 A1* | 9/2012 | Solomon ............ H04N 5/23229 348/222.1 |

(Continued)

FOREIGN PATENT DOCUMENTS

| JP | 2003108416 | 4/2003 |
| JP | 2008-061114 | 3/2008 |

(Continued)

OTHER PUBLICATIONS

How to Use Lightroom Sync (Sync Edits Onmultiple Images) By Gayle Vehar on Mar. 15, 2018 (Year: 2018).*

(Continued)

*Primary Examiner* — Edward F Urban
*Assistant Examiner* — Wassim Mahrouka
(74) *Attorney, Agent, or Firm* — JCIPRNET

(57) ABSTRACT

A non-transitory computer readable medium storing an image processing program causes a computer to function as: a processing unit that performs image processing on an image; and a control unit that controls the processing unit to execute first processing on a target image of the first processing instructed by a user and controls the processing unit to execute second processing corresponding to the first processing on a similar image that is similar to the target image.

19 Claims, 18 Drawing Sheets

(56) References Cited

U.S. PATENT DOCUMENTS

2015/0036931 A1* 2/2015 Loui .................. G06K 9/4671
382/195

FOREIGN PATENT DOCUMENTS

| JP | 2009-223764 | 10/2009 |
| JP | 2011114463 | 6/2011 |
| JP | 2015114828 | 6/2015 |

OTHER PUBLICATIONS

Lightroom Auto Spot Removal by Photography Essentials on Jun. 11, 2014 (Year: 2014).*
How to Crop Multiple Images at Once in Photoshop by Radu Stephan, Jun. 13, 2017 (Year: 2017).*
Office Action of Japan Counterpart Application, with English translation thereof, dated Jul. 26, 2022, pp. 1-9.

* cited by examiner

FIG. 7
| No. | CONTENT |
|---|---|
| 1 | MONOCHROME |
| 2 | SEPIA |
| 3 | VIVID |
| ⋮ | |
FIG. 8
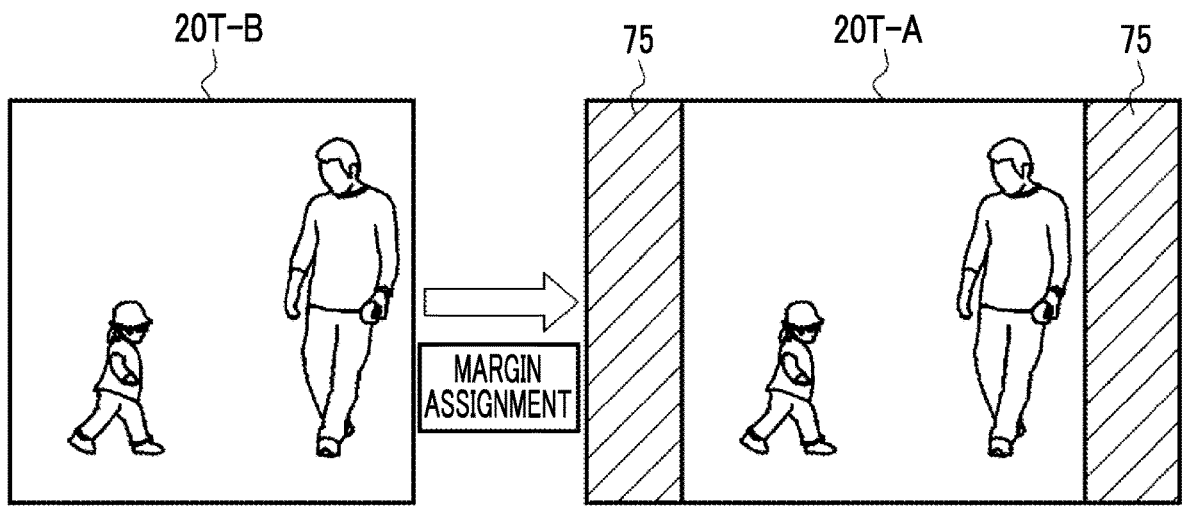
FIG. 9
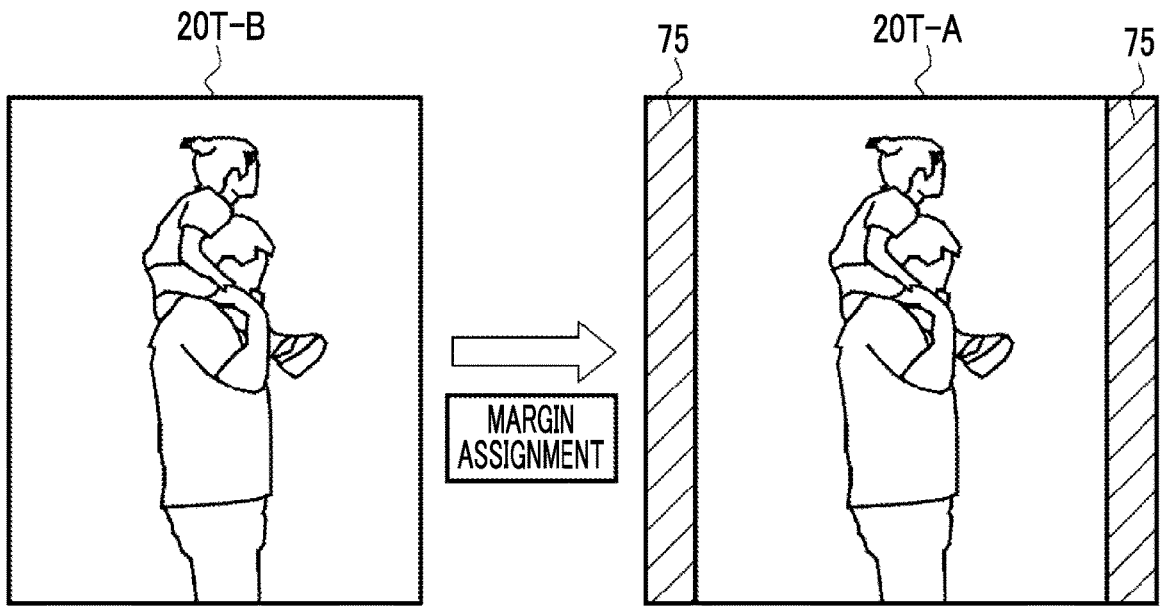

FIG. 10

| IMAGE ID | TARGET IMAGE | | OPERATION HISTORY | |
| --- | --- | --- | --- | --- |
| | BEFORE FIRST PROCESSING | AFTER FIRST PROCESSING | CONTENT | OPERATION POINT |
| IM0010 | | | TRIMMING (ENLARGEMENT) | (700,300) |
| IM0050 | | | IMAGE EFFECT B | |
| IM0070 | | | MARGIN ASSIGNMENT (SQUARE SHAPE → RECTANGULAR SHAPE) | |

EXECUTION HISTORY INFORMATION — 41

```
START
  │
ST10: EXTRACT SUBJECTS APPEARING IN EACH OF TARGET IMAGES
      BEFORE AND AFTER FIRST PROCESSING
  │
ST11: DETECT DEGREE OF REFLECTION OF SUBJECT AND DISTANCE
      BETWEEN OPERATION POINT AND SUBJECT IN TARGET IMAGE
      AFTER FIRST PROCESSING
  │
ST12: SCORING
  │
ST13: EXTRACT SUBJECT HAVING HIGHEST SCORE AS MAJOR SUBJECT
  │
 END
```

FIG. 14

| IMAGE ID | IMAGING DATE AND TIME | |
|---|---|---|
| IM0060 | 07.09.2018 10:22:48 | 20N |
| IM0061 | 07.09.2018 11:10:22 | |
| IM0062 | 07.09.2018 11:10:23 | MS |
| IM0063 | 07.09.2018 11:10:24 | |
| IM0064 | 07.09.2018 11:10:25 | MS — 20S |
| IM0065 | 07.09.2018 11:10:26 | |
| IM0066 | 07.09.2018 11:10:27 | |
| IM0067 | 07.09.2018 11:10:28 | |
| IM0068 | 07.09.2018 11:10:29 | MS 20T |
| IM0069 | 07.11.2018 14:15:18 | 20N |

FIG. 18A
FIG. 18B
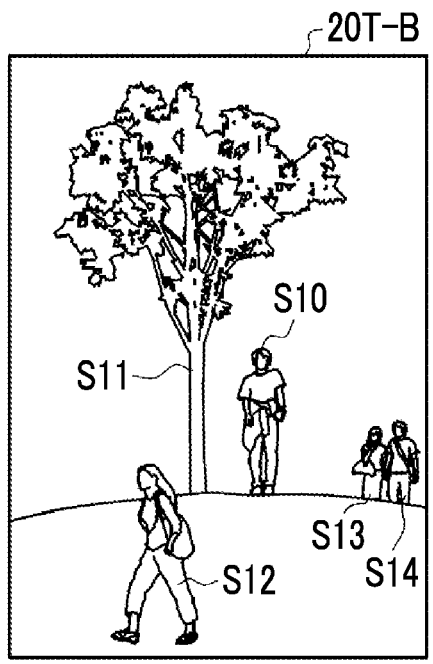
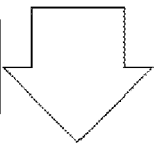
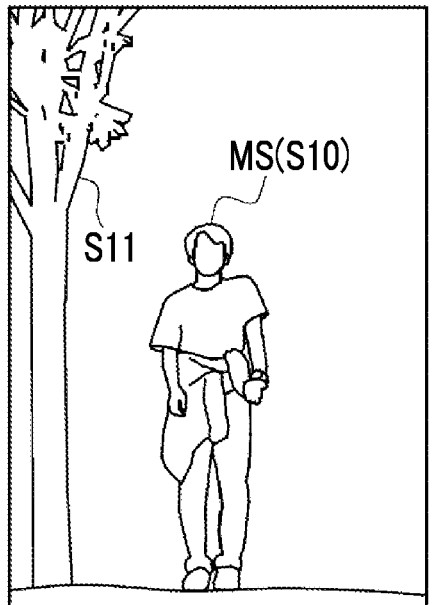
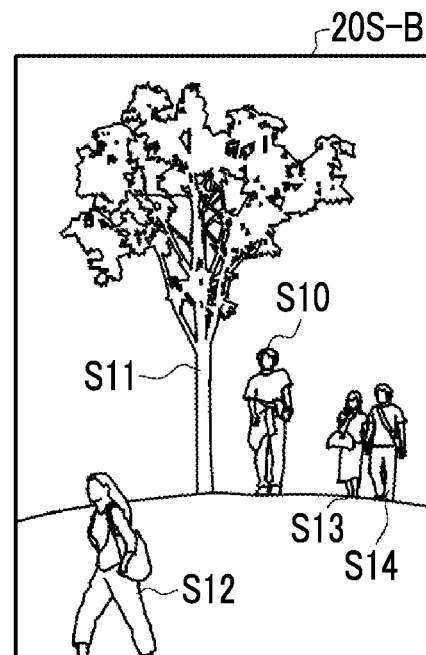
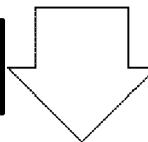
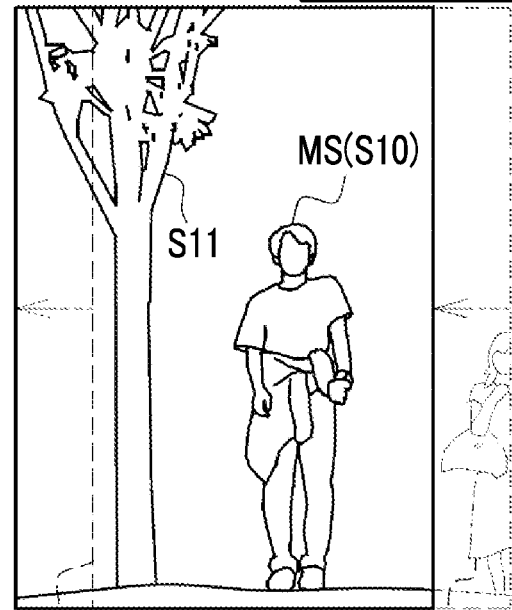

NON-TRANSITORY COMPUTER READABLE MEDIUM STORING IMAGE PROCESSING PROGRAM, IMAGE PROCESSING APPARATUS, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-179445 filed Sep. 25, 2018.

BACKGROUND

(i) Technical Field

The present disclosure relates to a non-transitory computer readable medium storing an image processing program, an image processing apparatus, and a non-transitory computer readable medium storing a program.

(ii) Related Art

JP2008-061114A discloses an automatic photo studio including: an imaging camera for capturing a still image of a subject at a wide angle; a person detection unit that generates a mask pattern of the subject from a captured image that is captured by the imaging camera, extracts a skin color portion from the captured image, and detects a mask pattern having a skin color portion in the mask pattern as a person pattern; and an automatic trimming unit that cuts out a portion, which corresponds to the mask pattern detected as a person pattern by the person detection unit, from the captured image and enlarges the cut partial image to a predetermined image size.

JP2009-223764A discloses an image importance degree determination method including: a step of acquiring images; a step of identifying attributes regarding the images; a step of classifying the acquired images for each attribute regarding the images; a step of selecting desired images from images acquired based on an image selection operation from a user; a step of classifying the selected images for each attribute regarding the images; a step of comparing the number of acquired images corresponding to the same attribute with the number of selected images corresponding to the same attribute among the acquired images and the selected images classified for each attribute regarding the images; and a step of creating an index indicating the degree of importance of each selected image, which is classified for each attribute, according to the result of comparison between the number of acquired images and the number of selected images and assigning the index to the selected image.

SUMMARY

An image captured by a mobile terminal having a camera function or the like is transmitted to a server on the communication line. Specifically, for example, an image is transmitted to a print management server on the communication line so that a printing machine installed in a convenience store or the like prints an image, or an image is transmitted to an image reception server on the communication line in order to post the image to a social networking service specialized for image sharing. In such a case, in advance of the transmission of the image, image processing, such as trimming, image effect, and margin assignment, may be executed on the image.

Incidentally, in recent years, it is possible to easily capture any number of images compared with the age of photographic film. For this reason, many images having similar compositions may be included in captured images. Hereinafter, images having a certain relationship, such as a similar composition, will be abbreviated as similar images. The similar images are, for example, images obtained by performing imaging at the same imaging location while slightly changing the angle of view without taking time or images captured using a continuous imaging function.

A case of selecting an image to be transmitted to a server on the communication line from such similar images is considered. In this case, image processing is executed on some of the similar images. At this time, the user needs to give an instruction of the same image processing on each of many similar images.

Aspects of non-limiting embodiments of the present disclosure relate to providing a non-transitory computer readable medium storing image processing program, an image processing apparatus, and a non-transitory computer readable medium storing program that can reduce a user's work burden on similar image processing compared with a case of giving an instruction of processing for each similar image.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a non-transitory computer readable medium storing an image processing program causing a computer to function as: a processing unit that performs image processing on an image; and a control unit that controls the processing unit to execute first processing on a target image of the first processing instructed by a user and controls the processing unit to execute second processing corresponding to the first processing on a similar image that is similar to the target image.

BRIEF DESCRIPTION OF THE DRAWINGS

Exemplary embodiment(s) of the present invention will be described in detail based on the following figures, wherein:

FIG. 7 is a diagram showing an example of image effect;

FIG. 8 is a diagram showing an example of margin assignment;

FIG. 9 is a diagram showing another example of margin assignment;

FIG. 10 is a diagram showing the content of execution history information;

FIG. 11 is a flowchart showing the outline of a major subject extraction procedure by a subject extraction unit;

FIG. 14 is a diagram showing how an image extraction unit extracts a similar image;

FIGS. 18A and 18B are diagrams showing how to execute, as the second processing, processing for excluding an exclusion target subject from similar images, where FIG. 18A shows a state of the first processing and FIG. 18B shows a state of the second processing;

DETAILED DESCRIPTION

First Exemplary Embodiment

Figure 1:
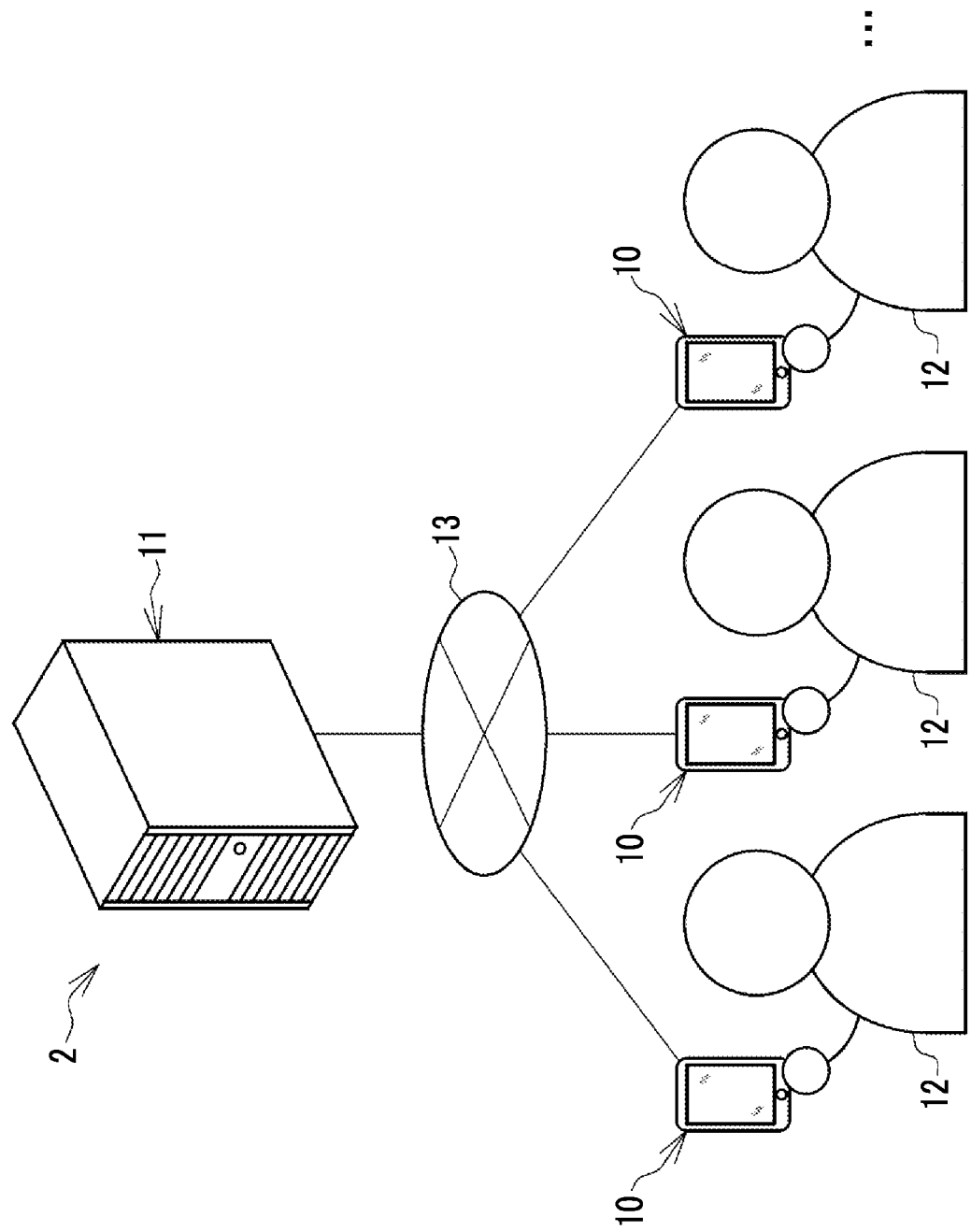
FIG. 1 is a diagram showing an image management system.

In FIG. 1, an image management system 2 includes a mobile terminal 10 and an image management server 11. The mobile terminal 10 is a terminal operated by a user 12 of the image management system 2. For example, the mobile terminal 10 is a tablet type personal computer, such as a smartphone. The mobile terminal 10 is an example of an image processing apparatus. The image management server 11 is a server computer. The mobile terminal 10 and the image management server 11 are communicably connected to each other through a wide area network (WAN) 13, such as the Internet or a public communication line.

The mobile terminal 10 and the image management server 11 are based on a computer, such as a tablet type personal computer, a server computer, and a workstation. The mobile terminal 10 and the image management server 11 are configured by installing a control program, such as an operating system, or various application programs onto these computers.

The mobile terminal 10 has a camera function, and can capture an image. The image captured by the mobile terminal 10 is transmitted to the image management server 11 through the WAN 13, and is stored and managed for each mobile terminal 10 (for each user 12) by the image management server 11. In addition, the image stored in the image management server 11 is transmitted to the mobile terminal 10 through the WAN 13, and can be viewed or image-processed by the mobile terminal 10.

In addition to the image management server 11, various servers to which images from the mobile terminal 10 are transmitted are present on the WAN 13. For example, there is a print management server that manages images to be printed by a printing machine installed in a convenience store or the like or an image reception server that receives images to be posted on a social networking service specialized for image sharing. In the case of transmitting an image to such a server, the user 12 may execute image processing, such as trimming, image effect, and margin assignment, on the image with the mobile terminal 10. Hereinafter, image processing instructed by the user 12 will be referred to as first processing, and an image to be subjected to the first processing is expressed as a target image 20T.

Figure 2:
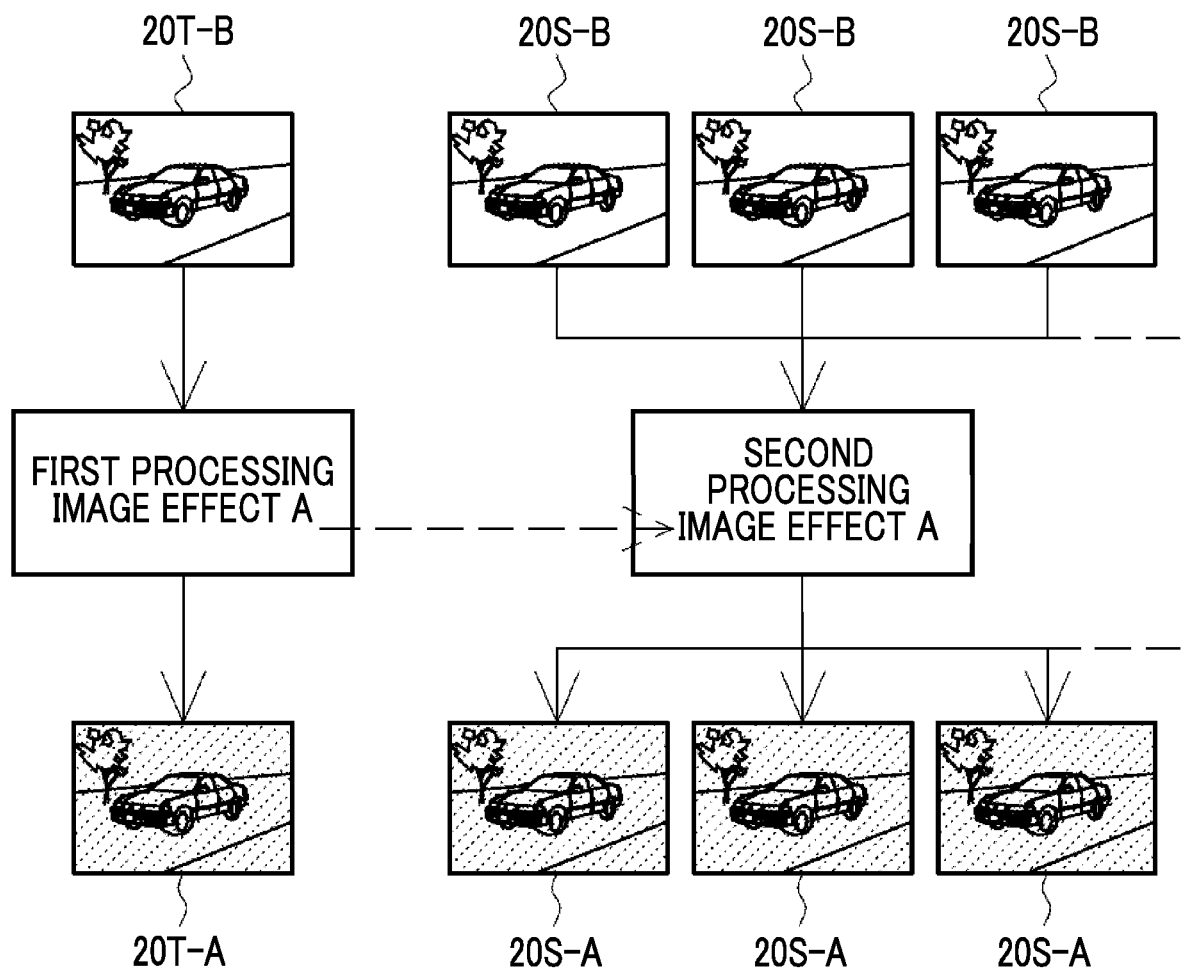
FIG. 2 is a diagram showing a state in which first processing is executed on a target image and second processing corresponding to the first processing is executed on a similar image that is similar to the target image.

As shown in FIG. 2, the mobile terminal 10 may execute second processing, which corresponds to the first processing executed on the target image 20T, on a similar image 20S that is similar to the target image 20T. Here, reference numeral 20T-B indicates the target image 20T before the first processing, and reference numeral 20T-A indicates the target image 20T after the first processing. Similarly, reference numeral 20S-B indicates the similar image 20S before the second processing, and reference numeral 20S-A indicates the similar image 20S after the second processing. Hereinafter, in a case where there is no particular need to distinguish, suffix "-B" and "-A" are not described. Examples of "being similar" include not only a form in which the target image 20T and the similar image 20S include the same subject as shown in FIG. 2 but also a form in which imaging dates and times are consecutive as will be described later, a form in which there is a predetermined imaging interval between images, and a form in which designation is given by the user 12.

FIG. 2 illustrates a case where image effect A as the first processing is executed on the target image 20T-B to obtain the target image 20T-A. In this case, also for the similar image 20S-B, the image effect A as the second processing is executed to obtain the similar image 20S-A.

Figure 3:
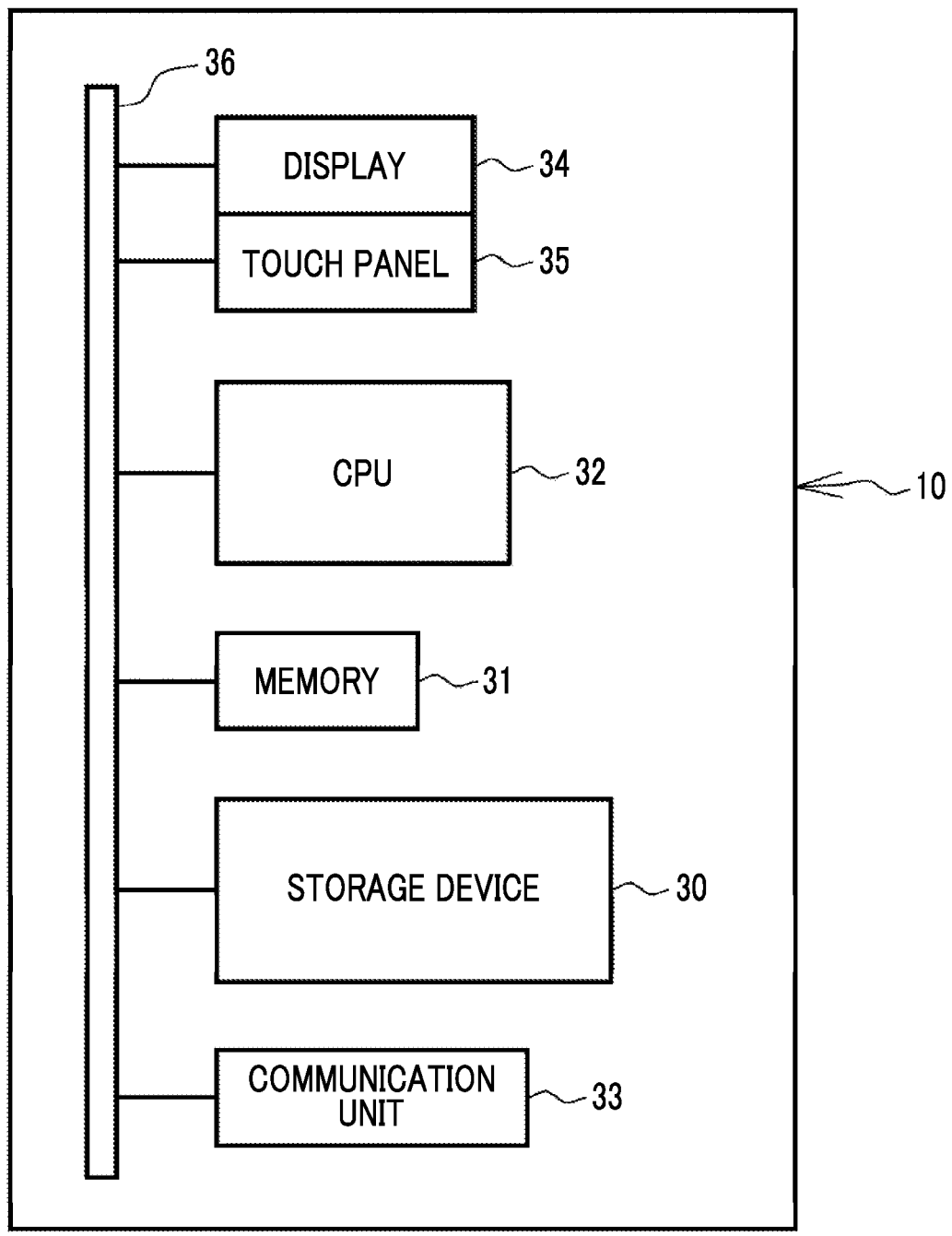
FIG. 3 is a block diagram showing a computer configuring a mobile terminal.

In FIG. 3, a computer configuring the mobile terminal 10 includes a storage device 30, a memory 31, a central processing unit (CPU) 32, a communication unit 33, a display 34, and a touch panel 35. These are connected to each other through a data bus 36.

The storage device 30 is a hard disk drive that is built into the computer configuring the mobile terminal 10 or connected to the computer configuring the mobile terminal 10 through a network. The storage device 30 stores a control program such as an operating system, various application programs, various kinds of data attached to these programs, and the like.

The memory 31 is a work memory for the CPU 32 to execute processing. The CPU 32 performs overall control of each unit of the computer by loading a program stored in the storage device 30 into the memory 31 and executing processing according to the program.

The communication unit 33 is a network interface for controlling the transmission of various kinds of information through the WAN 13. The display 34 displays various screens. An operation function by graphical user interface (GUI) is included in various screens. The computer configuring the mobile terminal 10 receives an input of an operation instruction from the touch panel 35 through various screens.

Figure 4:
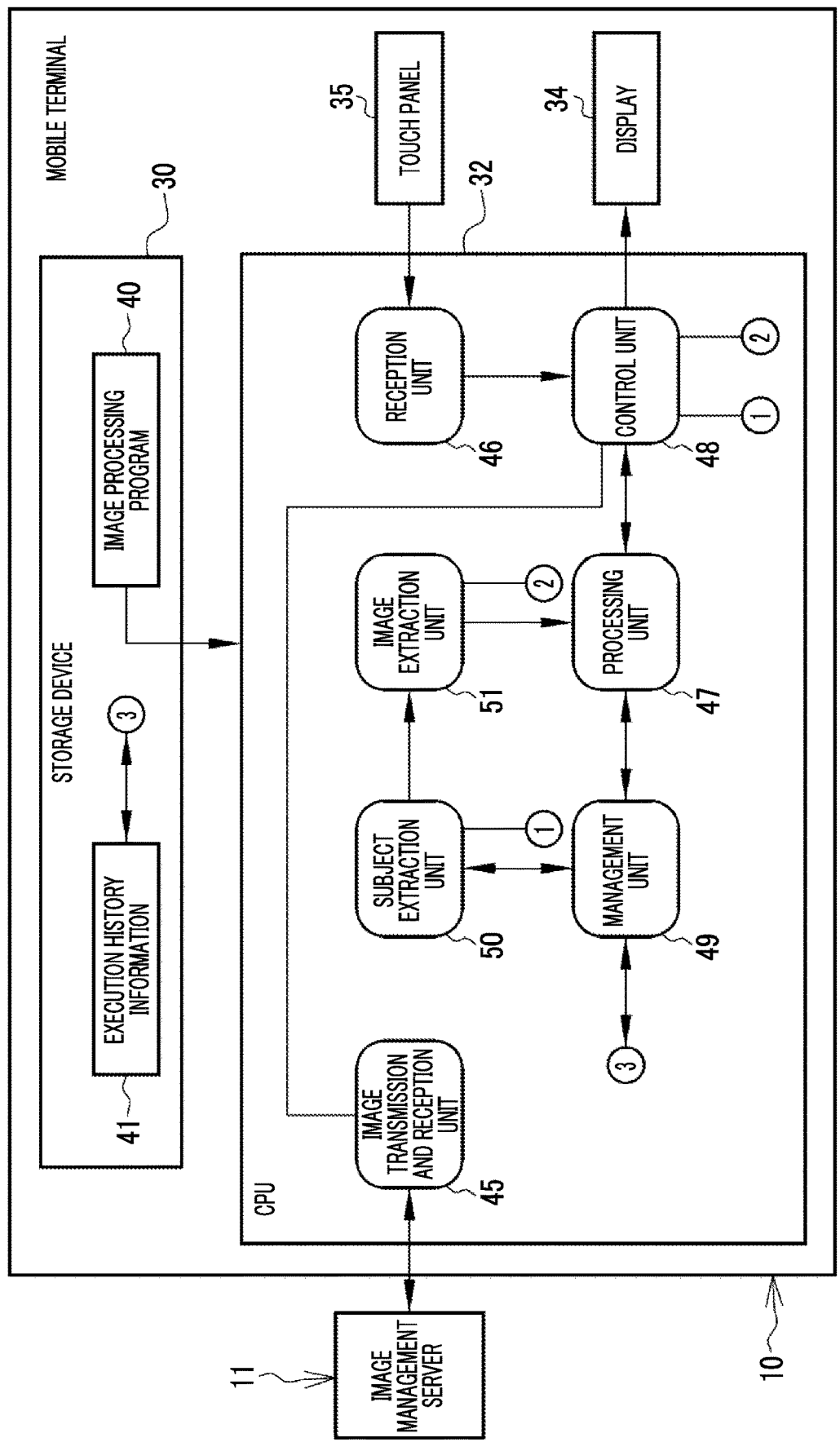
FIG. 4 is a block diagram showing a processing unit of a CPU of a mobile terminal.

In FIG. 4, the storage device 30 of the mobile terminal 10 stores an image processing program 40 as an application program. The image processing program 40 is an application program for causing the computer configuring the mobile terminal 10 to function as an image processing apparatus. In addition to the image processing program 40, execution history information 41 is stored in the storage device 30.

In a case where the image processing program 40 is activated, the CPU 32 of the mobile terminal 10 cooperates with the memory 31 and the like to function as an image transmission and reception unit 45, a reception unit 46, a processing unit 47, a control unit 48, a management unit 49, a subject extraction unit 50, and an image extraction unit 51.

The image transmission and reception unit 45 transmits an image to the image management server 11. In addition, the image transmission and reception unit 45 transmits a request for transmission of an image corresponding to the mobile terminal 10 to the image management server 11. Then, the image transmitted from the image management server 11 in response to the transmission request is received. The image transmission and reception unit 45 outputs the received image to the control unit 48.

The reception unit 46 receives various operation instructions through the touch panel 35. The operation instructions include an instruction to select the target image 20T and an instruction relevant to the first processing. The reception unit 46 outputs the received operation instruction to the control unit 48.

The processing unit 47 receives an instruction relevant to the first processing and the target image 20T (target image 20T-B before the first processing) from the control unit 48. Then, the first processing is executed on the target image 20T. In addition, the processing unit 47 receives the similar image 20S from the image extraction unit 51. Then, the second processing is executed on the similar image 20S. The processing unit 47 outputs the target image 20T-A after the first processing and the similar image 20S-A after the second processing to the control unit 48. In addition, the processing unit 47 outputs an instruction relevant to the first processing, the target image 20T-B before the first processing, and the target image 20T-A after the first processing, to the management unit 49.

The control unit 48 performs control based on the content of the operation instruction from the reception unit 46. Specifically, in a case where an instruction to select the target image 20T is received by the reception unit 46, the control unit 48 outputs the target image 20T instructed to be selected to the processing unit 47 and the subject extraction unit 50. In a case where the instruction relevant to the first processing is received by the reception unit 46, the control unit 48 outputs the instruction relevant to the first processing to the processing unit 47, and controls the processing unit 47 to execute the first processing according to the instruction on the target image 20T. In addition, the control unit 48 controls the processing unit 47 to execute the second processing on the similar image 20S.

The control unit 48 outputs the image from the image transmission and reception unit 45 to the image extraction unit 51. In addition, the control unit 48 performs control to display the target image 20T or the image from the image transmission and reception unit 45 on the display 34 (refer to FIG. 5).

The management unit 49 manages the execution history information 41 that is information of the execution history of the first processing. Specifically, the management unit 49 writes the instruction relevant to the first processing and the target images 20T-B and 20T-A from the processing unit 47, as the execution history information 41, into the storage device 30. In addition, the management unit 49 reads the execution history information 41 from the storage device 30 in response to the request from the processing unit 47 and the subject extraction unit 50, and outputs the read execution history information 41 to the processing unit 47 and the subject extraction unit 50.

In the case of executing the second processing, the processing unit 47 requests the management unit 49 to output the execution history information 41. The processing unit 47 executes the second processing corresponding to the content of the first processing of the execution history information 41 output from the management unit 49 in response to the request.

The subject extraction unit 50 applies a known subject recognition technique to the target image 20T from the control unit 48, and extracts subjects appearing in the target image 20T. In addition, the subject extraction unit 50 requests the management unit 49 to output the execution history information 41 corresponding to the target image 20T from the control unit 48. Then, based on the execution history information 41 output from the management unit 49 in response to the request, a major subject MS (refer to FIG. 12 and the like) is further extracted from the extracted subjects. The major subject MS is a subject presumed to have been mainly captured by the photographer of the target image 20T. The subject extraction unit 50 outputs information of the extracted major subject MS to the image extraction unit 51.

The image extraction unit 51 extracts the similar image 20S. Specifically, the image extraction unit 51 extracts an image including the major subject MS extracted by the subject extraction unit 50, among the images from the control unit 48, as the similar image 20S. The image extraction unit 51 outputs the extracted similar image 20S to the processing unit 47.

Figure 5:
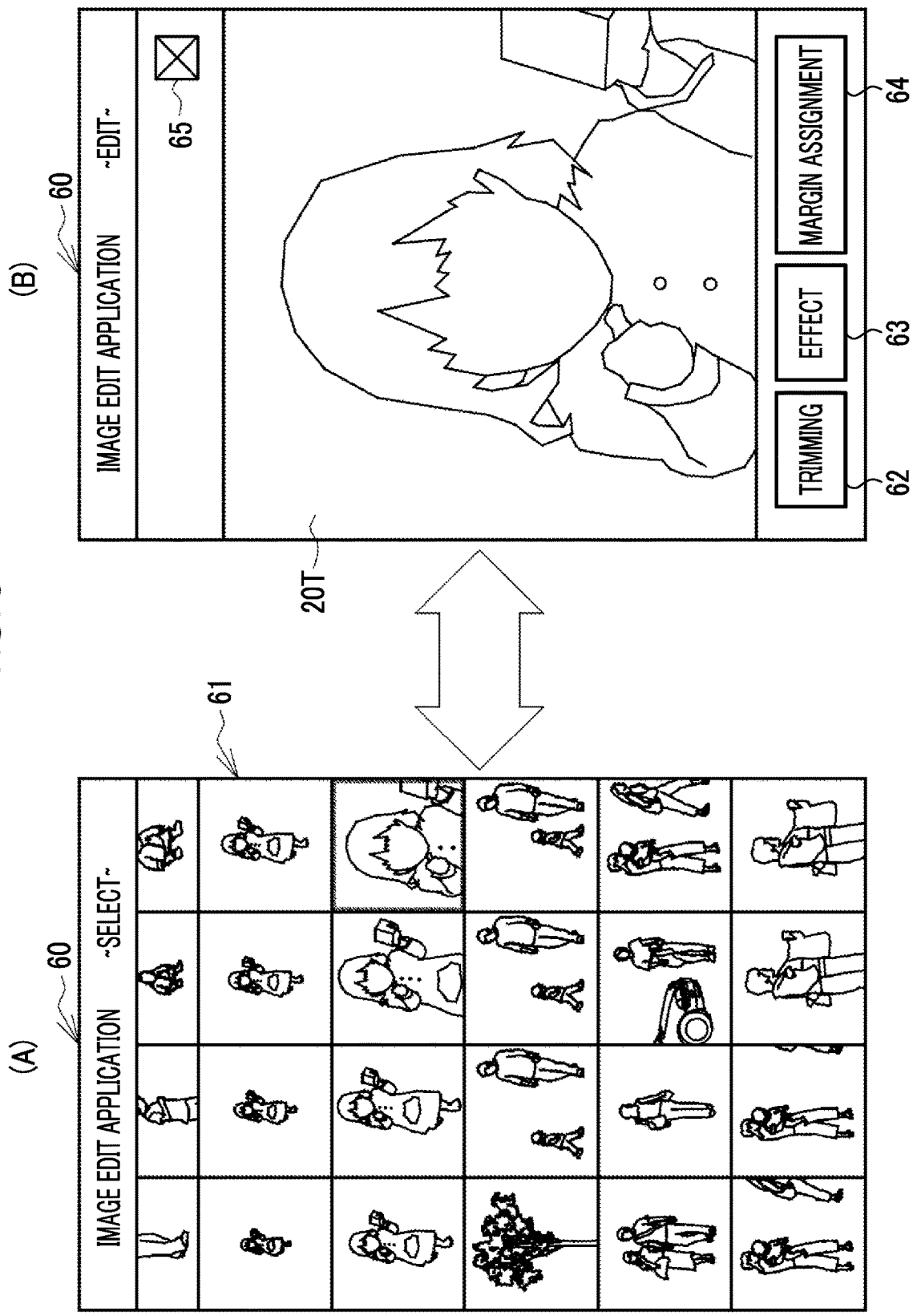
FIG. 5 is a diagram showing an image display screen, where (A) of FIG. 5 shows an image display screen on which a list of images are displayed and (B) of FIG. 5 shows an image display screen on which a target image is displayed so as to be enlarged.

FIG. 5 is an example of an image display screen 60 displayed on the display 34 of the mobile terminal 10 by the control unit 48. First, as shown in (A) of FIG. 5, the control unit 48 displays a list 61, in which thumbnails of images from the image transmission and reception unit 45 are arranged in tiles horizontally and vertically, on the image display screen 60. The images in the list 61 are images corresponding to the mobile terminal 10, which are all images stored in the image management server 11. For example, from the top to the bottom and from the left to the right, the imaging date and time of the images in the list 61 are new. Images that cannot be displayed at once on the image display screen 60 are scroll-displayed by a swipe operation or a flick operation on the touch panel 35. The swipe operation is an operation of sliding a finger in a certain direction with the finger touching the touch panel 35. The flick operation is an operation of releasing a finger from the touch panel 35 while sliding the finger in a certain direction on the touch panel 35.

As indicated by hatching, one image in the list 61 is selected by a tap operation of lightly tapping the touch panel 35 with a finger. This operation instruction corresponds to the instruction to select the target image 20T. In a case where the instruction to select the target image 20T is made, the control unit 48 switches the display of the list 61 to the enlarged display of the target image 20T as shown in (B) of FIG. 5. Then, a trimming button 62, an effect button 63, and a margin assignment button 64 are arranged in a lower portion of the image display screen 60.

In a case where the trimming button 62 is selected, the control unit 48 receives an instruction to trim the target image 20T, as an instruction relevant to the first processing, through the reception unit 46. Similarly, in a case where the effect button 63 and the margin assignment button 64 are selected, the control unit 48 receives an instruction of the image effect for the target image 20T and an instruction to assign a margin, as the instruction relevant to the first processing, through the reception unit 46. Reference numeral 65 is a cancel button for returning the enlarged display of the target image 20T to the display of the list 61.

Figure 6:
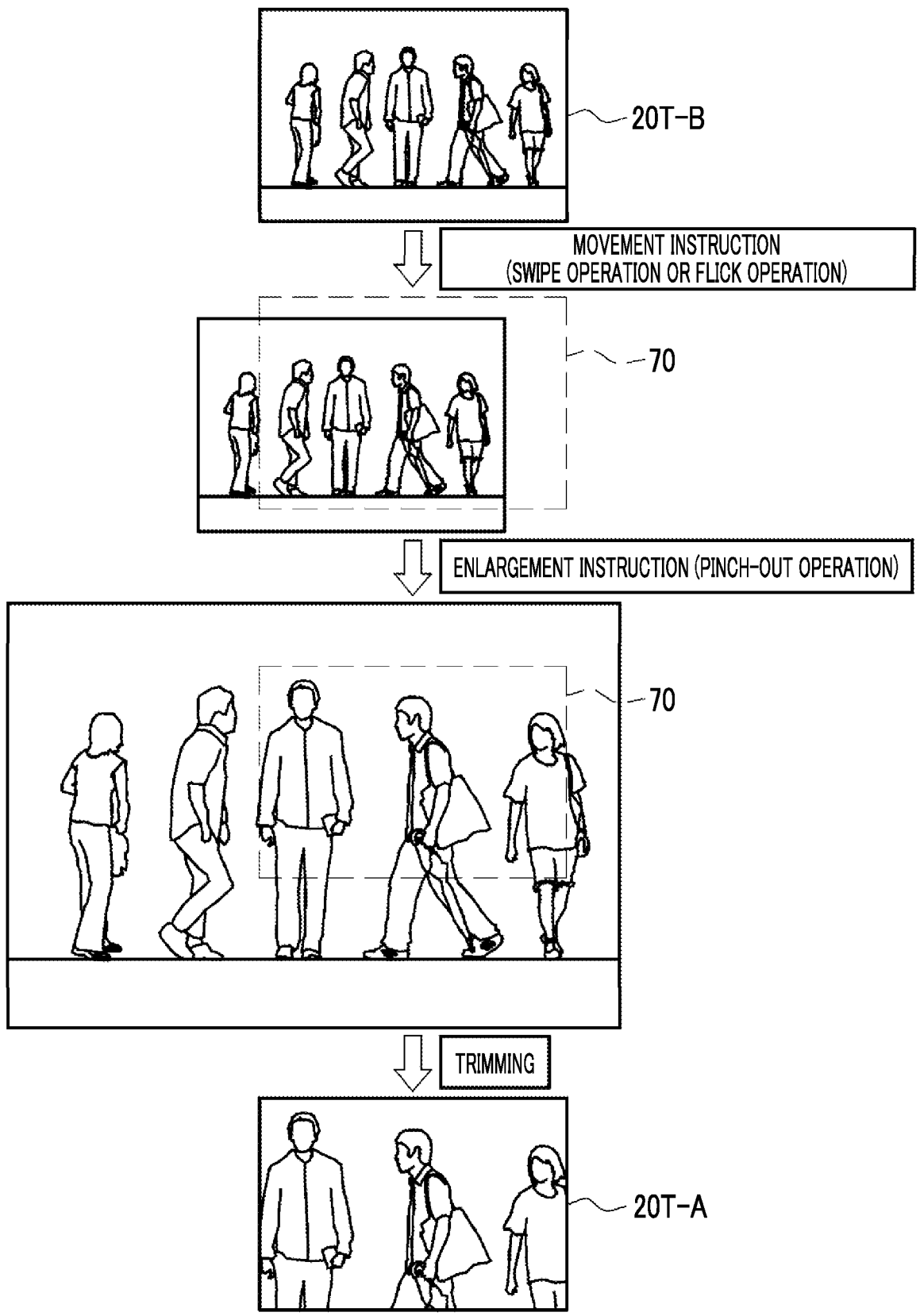
FIG. 6 is a diagram showing an example of an instruction of trimming.

As shown in FIG. 6, the trimming instruction includes an image movement instruction, an image enlargement instruction, and an image reduction instruction. The movement instruction is an instruction to move an image with respect to a predetermined image display frame 70. The enlargement instruction and the reduction instruction are instructions to change the size of the image displayed on the display frame 70.

The movement instruction is performed by a swipe operation or a flick operation. An image moves in the movement direction of a finger starting from a point where the finger is initially placed in the swipe operation or the flick operation. In the case of the movement instruction, a point where the finger is initially placed in the swipe operation or the flick operation corresponds to the operation point.

The enlargement instruction is performed by a pinch-out operation, and the reduction instruction is performed by a pinch-in operation. The pinch-out operation is an operation of placing two fingers (the index finger and the thumb) on the touch panel 35 in a state in which the two fingers are closed and spreading the space between the two fingers in this state. In contrast to the pinch-out operation, the pinch-in operation is an operation of placing the two fingers on the touch panel 35 in a state in which the two fingers are spaced apart from each other and narrowing the space between the two fingers in this state. In the enlargement instruction, an image is enlarged around the point where the two fingers are initially placed in the pinch-out operation. In the case of the enlargement instruction, a point where the two fingers are initially placed in the pinch-out operation corresponds to the operation point. In the reduction instruction, an image is reduced around the midpoint of the straight line connecting the points where the two fingers are initially placed in the pinch-in operation. In the case of the reduction instruction, a midpoint of the straight line connecting the points where the two fingers are initially placed in the pinch-in operation corresponds to the operation point.

The points where the two fingers are initially placed in the pinch-out operation are strictly two points. However, for example, the center of a circular region having a minimum radius including the two points is assumed to be the points where the two fingers are initially placed in the pinch-out operation. The operation point is not limited to the point where the finger of the user 12 is actually placed, such as in a case where the midpoint of the straight line connecting the points where the two fingers are initially placed in the pinch-in operation in the reduction instruction is the operation point. A point (endpoint in the pinch-in operation) where the two fingers are put together finally in the pinch-in operation in the reduction instruction may be the operation point.

FIG. 6 shows an example in which an instruction to move the target image 20T-B to the lower left is given first, an enlargement instruction is given subsequently, and a trimming instruction is finally given. FIG. 6 is merely an example, and the present disclosure is not limited thereto. Contrary to the example shown in FIG. 6, the movement instruction may be given after the enlargement instruction, or the movement instruction, the enlargement instruction, and the reduction instruction may be repeated several times. Only the enlargement instruction may be given without giving a movement instruction.

FIG. 7 shows an example of the image effect that can be instructed by selecting the effect button 63. Image effects include monochrome, sepia, vivid, and the like. Monochrome is an image effect to make an image monochrome. Sepia is an image effect to make an image sepia. Vivid is an image effect to increase the brightness and the saturation of an image.

FIGS. 8 and 9 are examples of margin assignment. FIG. 8 shows an example in which a margin 75 is given to the left and right sides of the square target image 20T-B to form the rectangular target image 20T-A. On the other hand, FIG. 9 shows an example in which the margin 75 is given to the left and right sides of the rectangular target image 20T-B to form the square target image 20T-A.

The trimming, the image effect, and the margin assignment can be executed individually or in combination. For example, it is also possible to execute margin assignment after executing vivid as an image effect.

In FIG. 10, in the execution history information 41, a combination of the target image 20T and the operation history of the instruction relevant to the first processing are registered for each image identification data (ID) for identifying an image. The target image 20T-B before the first processing and the target image 20T-A after the first processing are registered in the target image 20T. The content of the instruction relevant to the first processing and the operation point of the user 12 on the target image 20T-B are registered in the operation history.

FIG. 10 illustrates the target image 20T (image ID: IM0010) on which a trimming instruction accompanied by an enlargement instruction is given. In this case, the fact that trimming is accompanied by the enlargement instruction is registered in the content of the operation history. Although not shown, the enlargement ratio of the target image 20T-A based on the target image 20T-B is also registered in the content of the operation history. In a case where there is a trimming instruction accompanied by a movement instruction, the movement direction and the movement amount of the target image 20T-A based on the target image 20T-B are also registered in the content of the operation history. In the operation point of the operation history, as described above, the coordinates of the points where the two fingers are initially placed in the pinch-out operation are registered. For example, the coordinates are expressed as XY coordinates with a pixel at the left end of the image as the origin and the horizontal direction of the image as the X axis and the vertical direction as the Y axis.

FIG. 10 also illustrates the target image 20T (image ID: IM0050) on which an instruction of an image effect B is given and the target image 20T (image ID: IM0070) on which a margin assignment instruction to make the square target image 20T-B into the rectangular target image 20T-A is given. In the case of the image effect and the margin assignment, nothing is registered in the operation point of the operation history.

FIG. 11 is a flowchart showing the outline of the procedure of extracting the major subject MS by the subject extraction unit 50 in a case where the trimming is executed as the first processing. First, the subject extraction unit 50 extracts subjects appearing in each of the target image 20T-B and the target image 20T-A registered in the execution history information 41 from the management unit 49 (step ST10). Then, the subject extraction unit 50 detects the degree of reflection of each subject and the distance between the operation point and the subject in the target image 20T-A (step ST11).

Then, the subject extraction unit 50 scores the subjects extracted in step ST10 based on the degree of reflection of each subject and the distance between the operation point and the subject detected in step ST11 (step ST12). After scoring, the subject extraction unit 50 extracts a subject having the highest score as the major subject MS (step ST 13).

Figure 12:
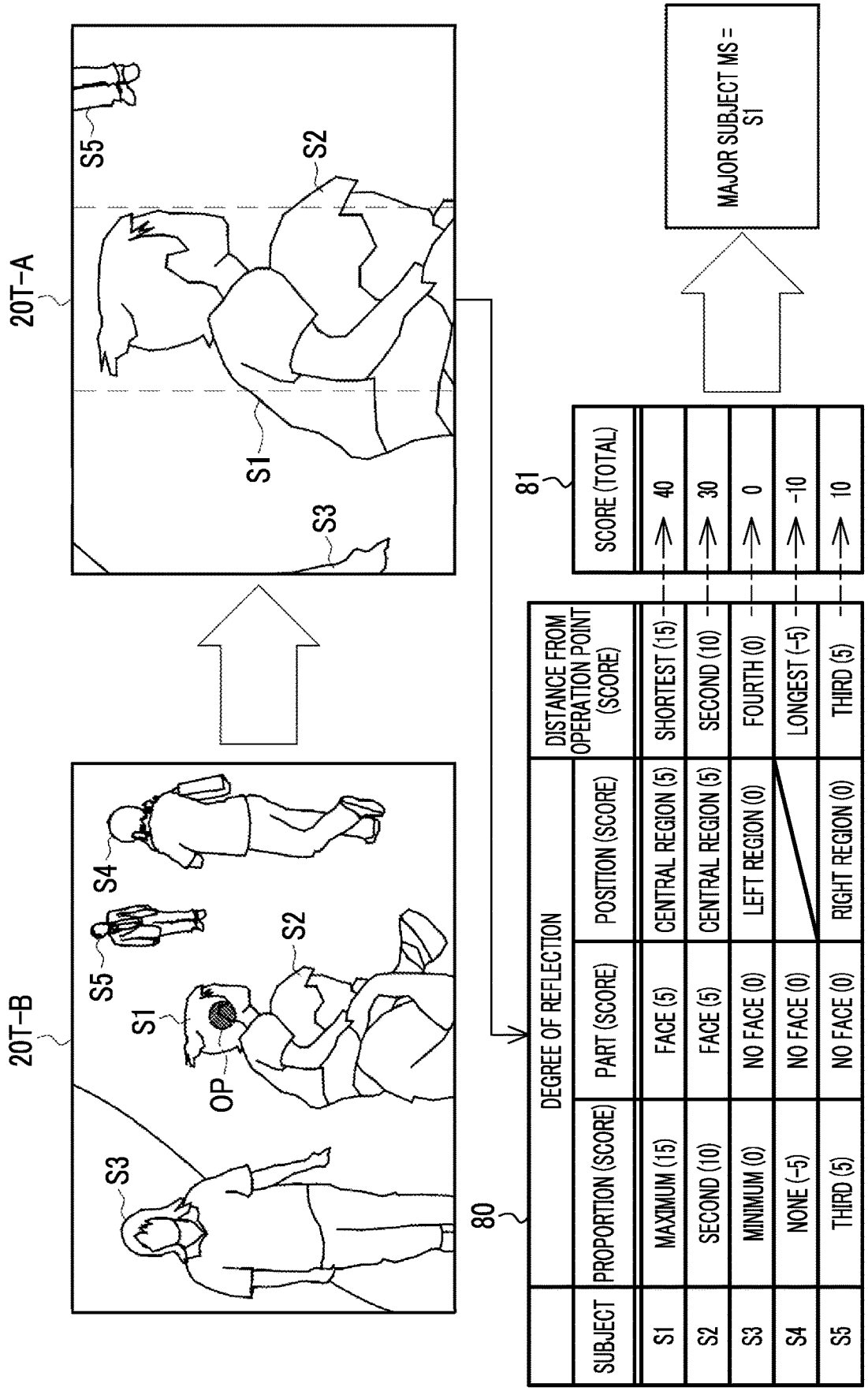
FIG. 12 is a diagram showing how the subject extraction unit extracts a major subject.

FIG. 12 shows how the subject extraction unit 50 extracts the major subject MS. FIG. 12 illustrates the target image 20T-B in which a girl S1 on a shoulder, a man S2 with the girl S1 on his shoulder, a woman S3 walking forward, a man S4 walking away, and a man S5 walking forward appear as subjects. In addition, FIG. 12 illustrates the target image 20T-A obtained by enlarging the girl S1 and the man S2 and executing the trimming using a point, which is indicated by reference numeral OP near the face of the girl S1, as an operation point.

In this case, the subject extraction unit 50 extracts the girl S1, the man S2, the woman S3, the man S4, and the man S5 from the target image 20T-B as subjects. In addition, the subject extraction unit 50 extracts the girl S1, the man S2, the woman S3, and the man S5 from the target image 20T-A as subjects. Then, for each of the subjects S1 to S5, the subject extraction unit 50 detects the degree of reflection in the target image 20T-A and the distance from the operation point.

As shown in a table 80, the degree of reflection is the proportion, part, and position of the subject included in the target image 20T-A. The proportion is the magnitude of the area ratio of the subject to the entire target image 20T-A. The part is, for example, the presence or absence of face reflection on the target image 20T-A. The position is the presence or absence in a central region in a case where the target image 20T-A is vertically divided into three equal parts as indicated by a broken line, for example.

Then, the subject extraction unit 50 scores each of the subjects S1 to S5 based on the detected degree of reflection of the subject and the detected distance between the operation point and the subject. Specifically, in regard to the proportion, 15 points as a highest score are given to the girl S1 with the highest proportion, and the next 10 points are given to the man S2 with the second highest proportion. Then, five points are given to the man S5 with the third highest proportion, and zero points are given to the woman S3 with the lowest proportion. In addition, −5 points are given to the man S4 who appears in the target image 20T-B but does not appear in the target image 20T-A. In regard to the part, five points are given to the girl S1 and the man S2 whose faces appear in the target image 20T-A, and zero points are given to the other subjects S3 to S5 whose faces does not appear. In regard to the position, five points are given to the girl S1 and the man S2 present in the central region of the target image 20T-A, and zero points are given to the other subjects S3 and S5 not present in the central region.

In regard to the distance between the operation point and the subject, 15 points as a highest score are given to the girl S1 whose distance to the operation point is the shortest, and the next 10 points are given to the man S2 whose distance to the operation point is the second shortest. Then, five points are given to the man S5 whose distance to the operation point is the third shortest, and zero points are given to the woman S3 whose distance to the operation point is the fourth shortest. In addition, −5 points are given to the man S4 whose distance to the operation point is the longest. The method of scoring shown herein is merely an example.

As shown in a table 81, the subject extraction unit 50 sums the scores obtained by the scoring described above. The total score of the girl S1 is 40 points that is the highest, the total score of the man S2 is 30 points, the total score of the woman S3 is zero points, the total score of the man S4 is −10 points, and the total score of the man S5 is 10 points. Therefore, the subject extraction unit 50 extracts the girl S1 having the highest score as the major subject MS.

The subject extraction unit 50 extracts the major subject MS based on the operation history of the instruction relevant to the first processing and the target image 20T-A. However, the present disclosure is not limited thereto. The subject extraction unit 50 may extract the major subject MS based on at least one of the operation history of the instruction relevant to the first processing or the target image 20T-A. Similarly, the subject extraction unit 50 may extract the major subject MS based on the degree of reflection of the subject in the target image 20T-A and the distance between the operation point and the subject. However, the present disclosure is not limited thereto. The subject extraction unit 50 may extract the major subject MS based on at least one of the degree of reflection of the subject in the target image 20T-A or the distance between the operation point and the subject. The degree of reflection may be at least one of the proportion, part, or position of the subject included in the target image 20T-A illustrated above. In addition, as the degree of reflection, the sharpness of the subject included in the target image 20T-A may be added.

Figure 13:
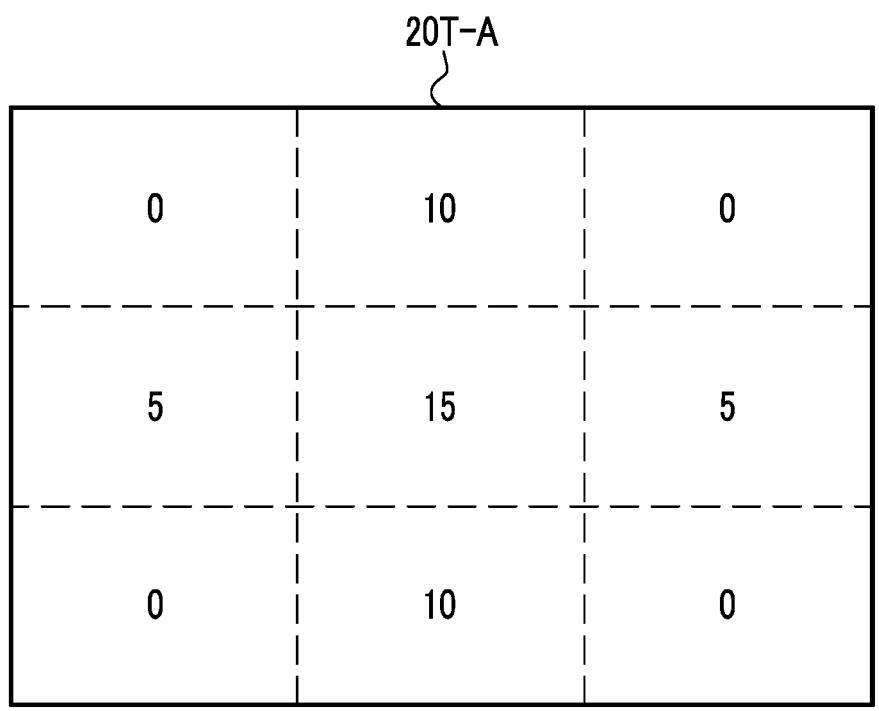
FIG. 13 is a diagram showing an example of scoring based on the position of a subject included in a target image after first processing.

As the scoring based on the part of the subject included in the target image 20T-A, scoring may be performed based on the presence or absence of the whole body reflection on the target image 20T-A instead of the presence or absence of face reflection on the target image 20T-A. As the scoring based on the position of the subject included in the target image 20T-A, as shown in FIG. 13, the target image 20T-A may be divided into nine equal parts (three equal parts in the vertical direction and three equal parts in the horizontal direction) as indicated by broken lines, and the scores of the nine equally divided regions may be set as indicated numbers.

FIGS. 11 and 12 are examples of extracting the major subject MS in a case where the trimming is executed as the first processing. On the other hand, in a case where the image effect and the margin assignment are executed as the first processing, the subject extraction unit 50 extracts the major subject MS based on the degree of reflection of the subject in the target image 20T-B. The degree of reflection is at least one of the proportion, part, or position of the subject included in the target image 20T-B in the same manner as described above. In the same manner as described above, the subject extraction unit 50 extracts subjects of the target image 20T-B, performs scoring on the extracted subjects, and extracts a subject having the highest score as the major subject MS.

In the case of the image effect, there is also a form in which the user 12 designates a subject on which the image effect is to be executed and the image effect is executed only on the subject designated by the user 12. In the case of such a form, the point of the subject designated by the user 12 as a subject on which the image effect is to be executed may be set as an operation point, and scoring based on the distance from the operation point may be performed.

As shown in FIG. 14, the image extraction unit 51 extracts a series of images, which are images having consecutive imaging dates and times with respect to the target image 20T and including the major subject MS extracted by the subject extraction unit 50 and of which front and back are separated by the image 20N not including the major subject MS, as the similar images 20S.

FIG. 14 illustrates the target image 20T which has an image ID of IM0068 and imaging date and time of 2018.07.09, 11:10:29 and in which a little girl appears as the major subject MS. In this case, an image which has an image ID of IM0060 and imaging date and time of 2018.07.09, 10:22:48 and in which a baby appears is an image 20N not including the major subject MS. Similarly, an image which has an image ID of IM0069 and imaging date and time of 2018.07.11, 14:15:18 and in which a tree appears is an image 20N not including the major subject MS. Then, images having image IDs of IM0061 to IM0067, in which a little girl who is the major subject MS appears and of which front and back are separated by the image 20N having an image ID of IM0060 and the image 20N having an image ID of IM0069, are extracted as the similar images 20S by the image extraction unit 51.

Figure 15:
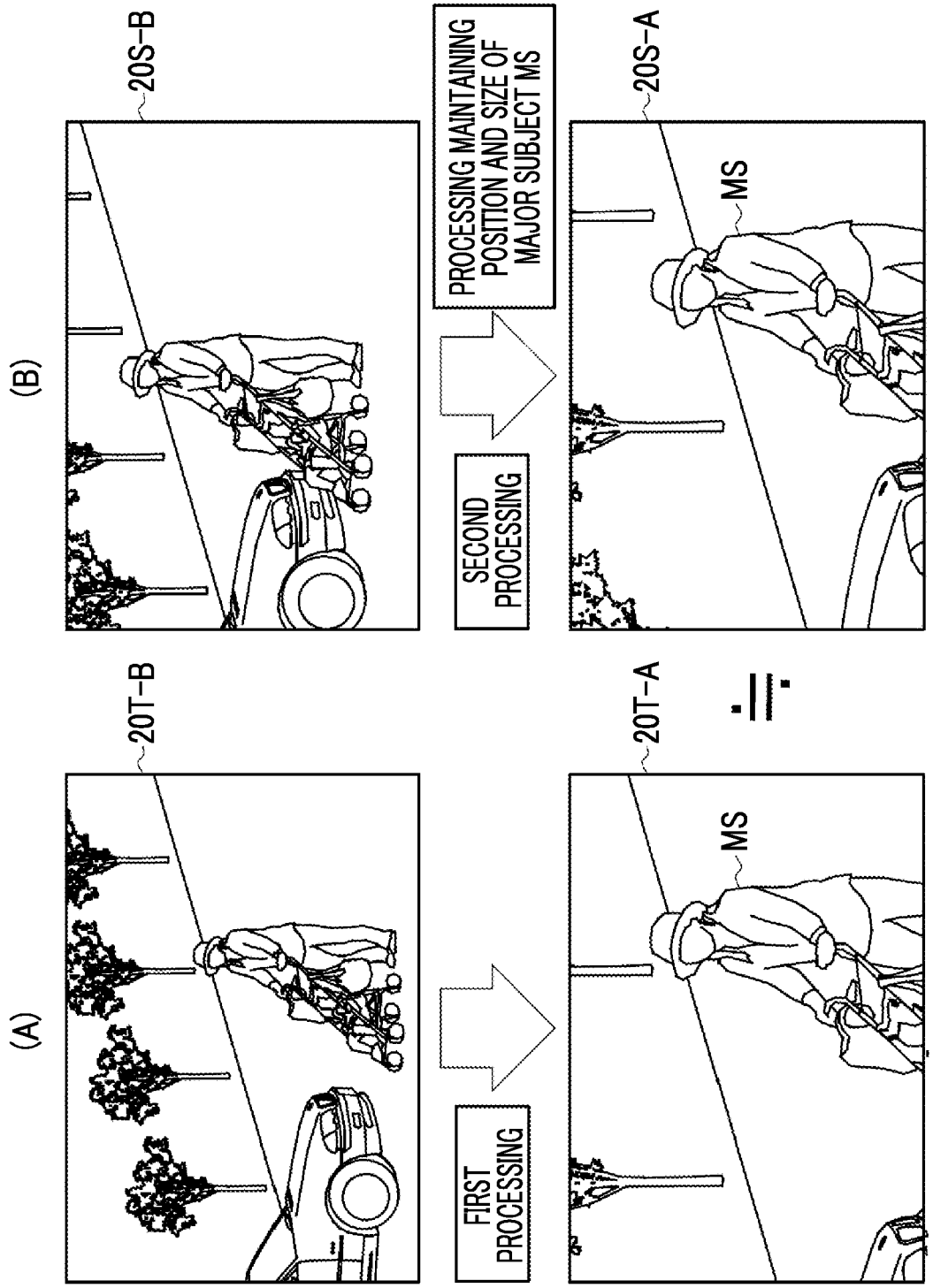
FIG. 15 is a diagram showing how to execute second processing so that a major subject of a similar image after the second processing has the same position and size as a major subject of a target image after the first processing, where (A) of FIG. 15 shows a state of the first processing and (B) of FIG. 15 shows a state of the second processing.

As shown in FIG. 15, in a case where the trimming is executed as the first processing, the processing unit 47 executes second processing so that the major subject MS of the similar image 20S-A after the second processing has the same position and size as the major subject MS of the target image 20T-A after the first processing.

(A) of FIG. 15 illustrates the target image 20T-B in which a woman pushing a baby carriage with a baby, a street tree, and an automobile appear as subjects. Then, the target image 20T-A is illustrated in which the woman is extracted as the major subject MS by mainly enlarging the upper body portion of the woman to execute trimming as the first processing. (B) of FIG. 15 illustrates the similar image 20S-B in which the baby carriage and the woman are closer to the automobile than in the target image 20T-B and which is zoomed in compared with the target image 20T-B. In this case, the processing unit 47 executes the second processing so that the position and the size of the woman, who is the major subject MS, are the same as those of the woman appearing in the target image 20T-A, thereby creating the similar image 20S-A. Therefore, the position of the street tree or the automobile in the similar image 20S-A is slightly different from that in the target image 20T-A, but the position and the size of the woman who is the major subject MS are approximately the same as the target image 20T-A.

FIG. 15 shows an example of the second processing in a case where the trimming is executed as the first processing. On the other hand, in a case where the image effect and the margin assignment are executed as the first processing, the processing unit 47 executes, as the second processing, the same image effect and margin assignment as in the first processing. In the case of a form in which the image effect is executed only on the subject designated by the user 12, the image effect is also executed only on the subject designated by the user 12 in the second processing.

The target image 20T-B before the first processing and the target image 20T-A after the first processing are stored and managed in association with each other by the image management server 11. Similarly, the similar image 20S-B before the second processing and the similar image 20S-A after the second processing are stored and managed in association with each other by the image management server 11.

Figure 16:
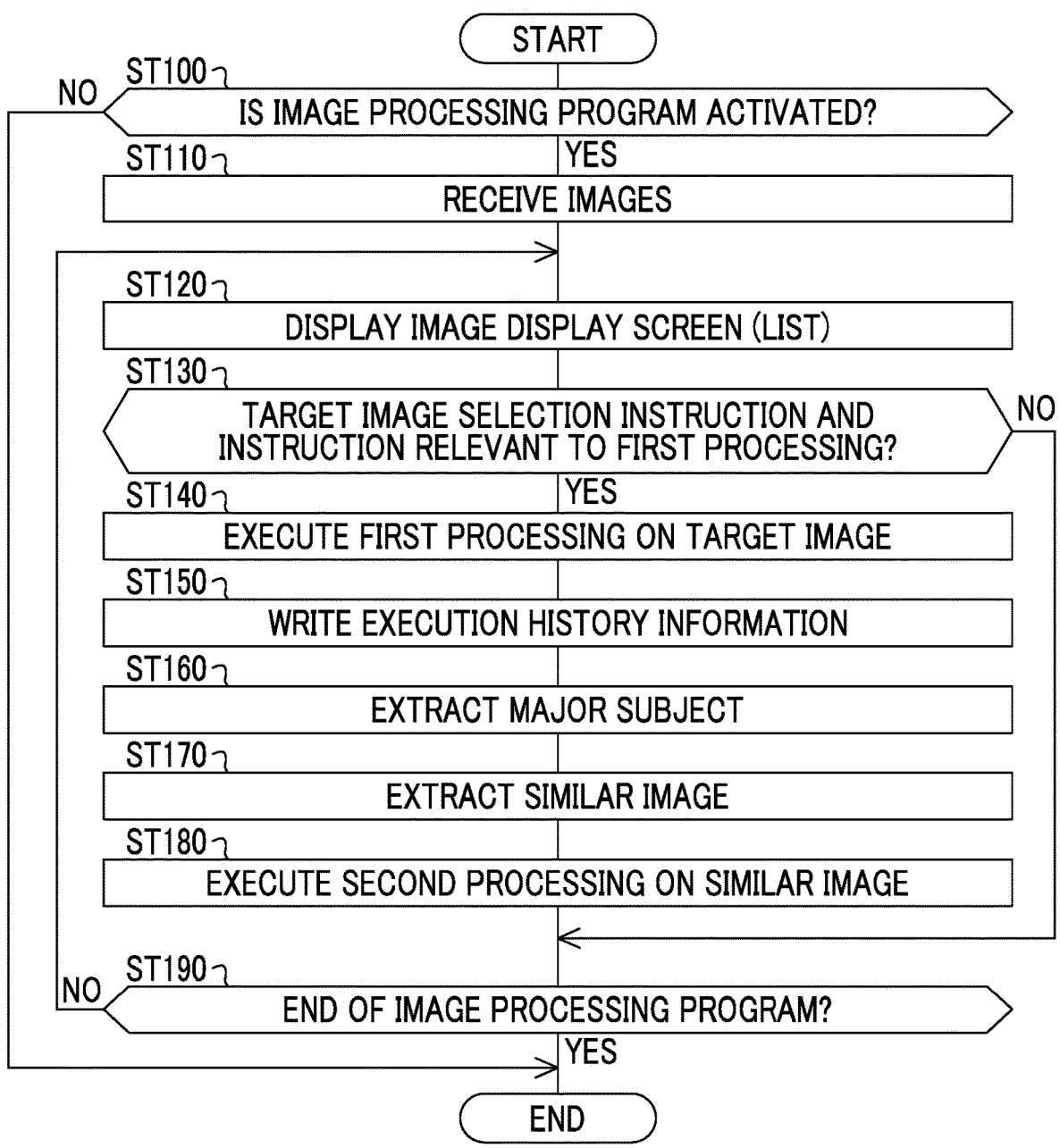
FIG. 16 is a flowchart showing a processing procedure of a mobile terminal.

Hereinafter, an operation according to the above configuration will be described with reference to the flowchart of FIG. 16. First, in a case where the image processing program 40 is activated (YES in step ST100), the CPU 32 functions as the image transmission and reception unit 45, the reception unit 46, the processing unit 47, the control unit 48, the management unit 49, the subject extraction unit 50, and the image extraction unit 51 and a computer configuring the mobile terminal 10 functions as an image processing apparatus as shown in FIG. 4.

The image transmission and reception unit 45 transmits a request for transmission of an image corresponding to the mobile terminal 10 to the image management server 11. Then, the image transmitted from the image management server 11 in response to the transmission request is received by the image transmission and reception unit 45 (step ST110). The image is output from the image transmission and reception unit 45 to the control unit 48.

The image is displayed as the list 61 on the image display screen 60 by the control unit 48, as shown in (A) of FIG. 5 (step ST120). In a case where one image in the list 61 is selected, that is, in a case where an instruction to select the target image 20T is received by the reception unit 46, the image display screen 60 is switched to the enlarged display of the target image 20T by the control unit 48 as shown in (B) of FIG. 5. In a case where one of the trimming button 62, the effect button 63, or the margin assignment button 64 is selected in this state and the instruction relevant to the first processing is received by the reception unit 46 (YES in step ST130), the control unit 48 controls the processing unit 47 to execute the first processing on the target image 20T-B (step ST140). Then, the execution history information 41 shown in FIG. 10 is written into the storage device 30 by the management unit 49 (step ST150).

Then, the major subject MS is extracted by the subject extraction unit 50 (step ST160). In a case where the trimming is executed as the first processing, as shown in FIGS. 11 and 12, the major subject MS is extracted based on the degree of reflection of each subject in the target image 20T-A and the distance between the subject and the operation point of the user 12 on the target image 20T-B. Information of the major subject MS is output from the subject extraction unit 50 to the image extraction unit 51.

The subject extraction unit 50 extracts the major subject MS based on at least one of the operation history of the instruction of the user 12 relevant to the first processing, the target image 20T-B before the first processing, or the target image 20T-A after the first processing. More specifically, the subject extraction unit 50 extracts the major subject MS based on at least one of the degree of reflection of each subject in the target image 20T-A after the first processing or the distance between the subject and the operation point of the user 12 on the target image 20T-B in the operation history. Therefore, the probability of extracting the appropriate major subject MS is increased.

Even a subject present in the central region in the target image 20T-B before the first processing is not necessarily present in the central region in the target image 20T-A after trimming as the second processing. In some cases, even a subject present in the central region in the target image 20T-B before the first processing may not be present in the target image 20T-A. Therefore, extracting the major subject MS based on the target image 20T-A after the first processing is particularly meaningful since this further draws on the intention of the user 12 included in the first processing.

The degree of reflection is at least one of the proportion, part, or position of the subject included in the target image 20T-A after the first processing. Therefore, for example, since it is possible to extract, as the major subject MS, a subject whose proportion is large and whose face appears and which is present in the central region of the image, the likelihood of the extracted major subject MS is increased.

Then, as shown in FIG. 14, the similar image 20S is extracted by the image extraction unit 51 (step ST170). Specifically, a series of images, which are images having consecutive imaging dates and times with respect to the target image 20T and including the major subject MS and of which front and back are separated by the image 20N not including the major subject MS, are extracted as the similar images 20S. The similar image 20S is output from the image extraction unit 51 to the processing unit 47.

Since the similar image 20S is extracted by the image extraction unit 51, time and labor for the user 12 to extract the similar image 20S are not required.

The subject extraction unit 50 extracts the major subject MS, and the image extraction unit 51 extracts an image including the major subject MS as the similar image 20S. Therefore, an image whose composition is more similar to the target image 20T is extracted as the similar image 20S.

The image extraction unit 51 extracts a series of images, which are images having consecutive imaging dates and times with respect to the target image 20T and including the major subject MS and of which front and back are separated by the image 20N not including the major subject MS, as the similar images 20S. Therefore, the probability of extracting an appropriate image as the similar image 20S is increased.

The control unit 48 controls the processing unit 47 to execute the second processing on the similar image 20S-B (step ST180). As shown in FIG. 15, in a case where the trimming is executed as the first processing, the processing unit 47 executes second processing so that the major subject MS of the similar image 20S-A after the second processing has the same position and size as the major subject MS of the target image 20T-A after the first processing.

The second processing is image processing in which the major subject MS of the similar image 20S-A after the second processing has the same position and size as the major subject MS of the target image 20T-A after the first processing. Accordingly, since the degree of reflection of the major subject MS in the similar image 20S-A is approximately the same as that of the major subject MS in the target image 20T-A, comparison between the target image 20T-A and the similar image 20S-A and comparison between the similar images 20S-A become easy.

The processing from step ST120 to step ST180 is repeated until the image processing program 40 is ended (YES in step ST190).

The control unit 48 controls the processing unit 47 to execute the first processing on the target image 20T of the first processing instructed by the user 12. In addition, the control unit 48 controls the processing unit 47 to execute the second processing corresponding to the first processing on the similar image 20S that is similar to the target image 20T. The user 12 merely gives an instruction relevant to the first processing on the target image 20T, so that the second processing corresponding to the first processing is executed on the similar image 20S. Accordingly, compared with a case of giving an instruction to execute processing on each similar image 20S, the work burden of the user 12 on the image processing of the similar image 20S is reduced. Therefore, it becomes easy to select an image to be transmitted to a print management server, an image reception server, or the like from the similar images 20S including the target image 20T.

Second Exemplary Embodiment

Figure 17:
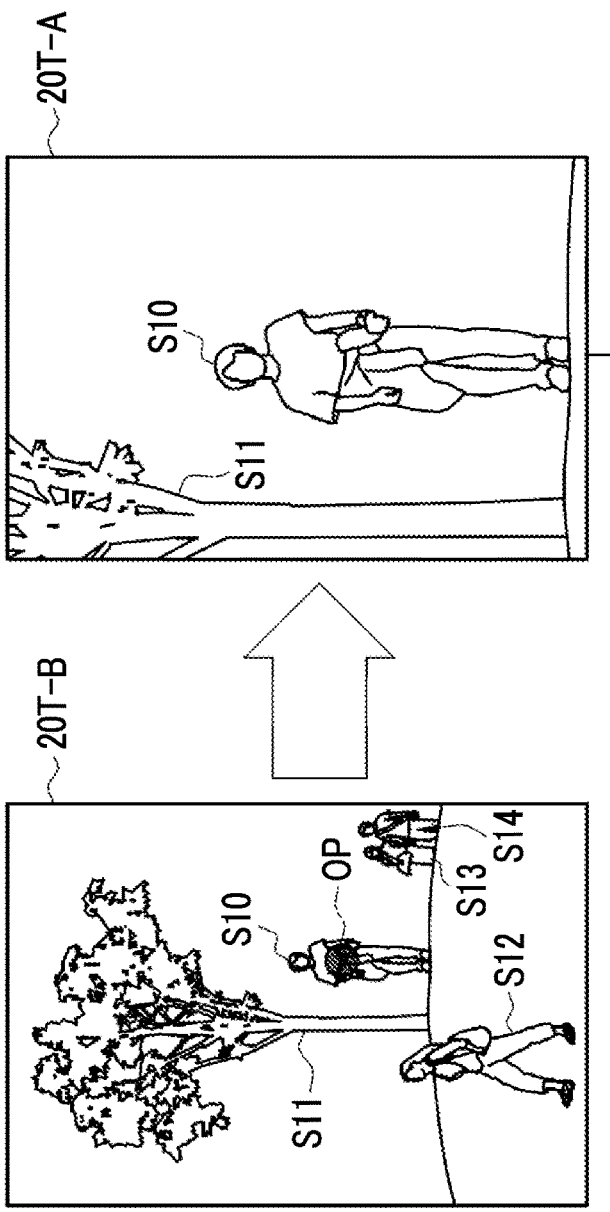
FIG. 17 is a diagram showing how the subject extraction unit extracts a major subject and an exclusion target subject.

In a second exemplary embodiment shown in FIGS. 17, 18A, and 18B, processing for extracting an exclusion target subject ES, which is a subject to be excluded, from the target image 20T and excluding the exclusion target subject ES from the similar image 20S is executed as the second processing.

FIG. 17 illustrates the target image 20T-B in which a man S10, a tree S11 standing on the right side of the man S10, a woman S12 who is walking, a woman S13 of a couple, and a man S14 of the couple appear as subjects. In addition, FIG. 17 illustrates the target image 20T-A obtained by enlarging the man S10 and executing the trimming using a point, which is indicated by the reference numeral OP near the chest of the man S10, as an operation point.

Also in this case, as in the case shown in FIG. 12, as shown in a table 85, each of the subjects S10 to S14 is scored based on the degree of reflection of each subject of the target image 20T-A and the distance between the operation point and the subject. Then, as shown in a table 86, the total score of the subjects S10 to S14 is calculated.

The subject extraction unit 50 extracts the major subject MS, and also extracts the exclusion target subject ES. In FIG. 17, as in the case shown in FIG. 12, the subject extraction unit 50 extracts the man S10 having the highest score as the major subject MS. In addition, the subject extraction unit 50 extracts the subjects S13 and S14 having negative scores as the exclusion target subjects ES. The extraction conditions of the exclusion target subject ES are not limited to the subjects having negative scores described above. Only a subject having the lowest score may be extracted as the exclusion target subject ES, or a subject having a score of 0 or less may be extracted as the exclusion target subject ES.

In FIGS. 18A and 18B, the target image 20T-B before the first processing and the target image 20T-A after the first processing are the same as those shown in FIG. 17. FIG. 18B illustrates the similar image 20S-B in which the man S10 and the tree S11 are not changed but the woman S12 moves to the left and the woman S13 and the man S14 of the couple approach the man S10.

In this case, as in the case shown in FIG. 15, the processing unit 47 executes the second processing so that the position and the size of the man S10, who is the major subject MS, are the same as the position and the size of the man S10 appearing in the target image 20T-A. However, in a case where such second processing is executed, the woman S13 who is the exclusion target subject ES appears in the similar image 20S-A as indicated by the broken line. Therefore, as indicated by the arrow, the processing unit 47 moves the display frame 70 to the left so that the woman S13 who is the exclusion target subject ES does not appear in the similar image 20S-A. The processing for moving the display frame 70 is processing for excluding the exclusion target subject ES from the similar image 20S-A.

As described above, in the second exemplary embodiment, the subject extraction unit 50 extracts the exclusion target subject ES from the target image 20T, and the processing unit 47 executes processing for excluding the exclusion target subject ES from the similar image 20S as the second processing. The exclusion target subject ES is considered to be a subject having a relatively high probability that the user 12 desires to positively exclude from the image. Therefore, it can be said that the processing for excluding the exclusion target subject ES from the similar image 20S is the second processing that draws the intention of the user 12 included in the first processing.

Third Exemplary Embodiment

Figure 19:
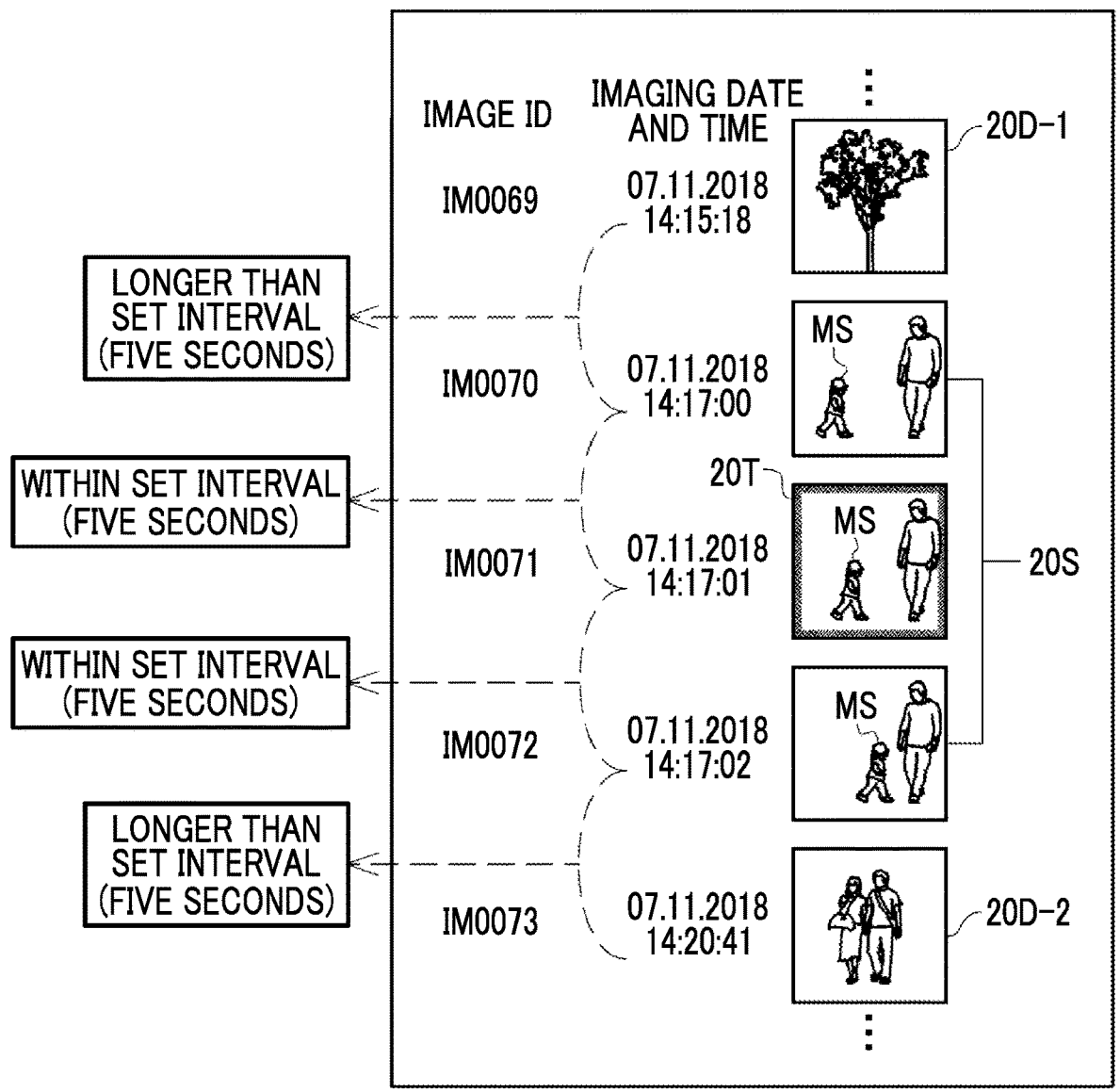
FIG. 19 is a diagram showing how to extract a similar image based on an imaging interval with respect to a target image.

In a third exemplary embodiment shown in FIG. 19, the image extraction unit 51 extracts the similar image 20S based on an imaging interval with respect to the target image 20T. More specifically, the image extraction unit 51 extracts a series of images, which are images having consecutive imaging dates and times with respect to the target image 20T and of which front and back are separated by an image 20D-1 whose imaging interval with respect to an immediately following image is longer than the set interval and an image 20D-2 whose imaging interval with respect to an immediately preceding image is longer than the set interval, as the similar images 20S.

FIG. 19 illustrates the target image 20T which has an image ID of IM0071 and imaging date and time of 2018.07.11, 14:17:01 and in which a little girl appears as the major subject MS. In addition, five seconds are exemplified as the set interval. In this case, an image which has an image ID of IM0069 and imaging date and time of 2018.07.11, 14:15:18 and in which a tree appears is the image 20D-1 whose imaging interval with respect to an immediately following image (image having an image ID of IM0070 and imaging date and time of 2018.07.11, 14:17:00) is longer than the set interval. An image which has an image ID of IM0073 and imaging date and time of 2018.07.11, 14:20:41 and in which a couple appears is the image 20D-2 whose imaging interval with respect to an immediately preceding image (image having an image ID of IM0072 and imaging date and time of 2018.07.11, 14:17:02) is longer than the set interval. Then, images having image IDs of IM0070 and IM0072, of which front and back are separated by the image 20D-1 having an image ID of IM0069 and the image 20D-2 having an image ID of IM0073, are extracted as the similar images 20S by the image extraction unit 51.

As described above, in the third exemplary embodiment, the image extraction unit 51 extracts the similar image 20S based on the imaging interval with respect to the target image 20T. Therefore, the similar image 20S is extracted based on the information of the imaging date and time. It is not necessary to check whether or not the major subject MS is included in the image as in the method shown in FIG. 14.

In addition, the image extraction unit 51 extracts a series of images, which are images having consecutive imaging dates and times with respect to the target image 20T and of which front and back are separated by the image 20D-1 whose imaging interval with respect to an immediately following image is longer than the set interval and the image 20D-2 whose imaging interval with respect to an immediately preceding image is longer than the set interval, as the similar images 20S. Therefore, the probability of extracting an appropriate image as the similar image 20S is increased.

Although the set interval is set to five seconds, this is merely an example. Assuming that images are captured using a continuous imaging function, the set interval may be one second. Conversely, the set interval may be, a longer, one minute or the like. The user 12 may be able to change the set interval.

An image whose imaging interval with respect to the target image 20T is within the set range may be extracted as the similar image 20S. For example, an image captured within one minute before and after the target image 20T is extracted as the similar image 20S.

The method of extracting an image including the major subject MS as the similar image 20S in the first exemplary embodiment and the method of extracting the similar image 20S based on the imaging interval with respect to the target image 20T in the third exemplary embodiment may be used in combination. For example, for images whose imaging intervals with respect to the target image 20T are within the set range, the method shown in FIG. 14 may be applied to extract the similar image 20S. Alternatively, the similar image 20S is extracted by using the method shown in FIG. 14. Then, for the similar images 20S extracted by using the method shown in FIG. 14, the method shown in FIG. 19 may be applied to narrow down the range of the similar images 20S.

Fourth Exemplary Embodiment

Figure 20:
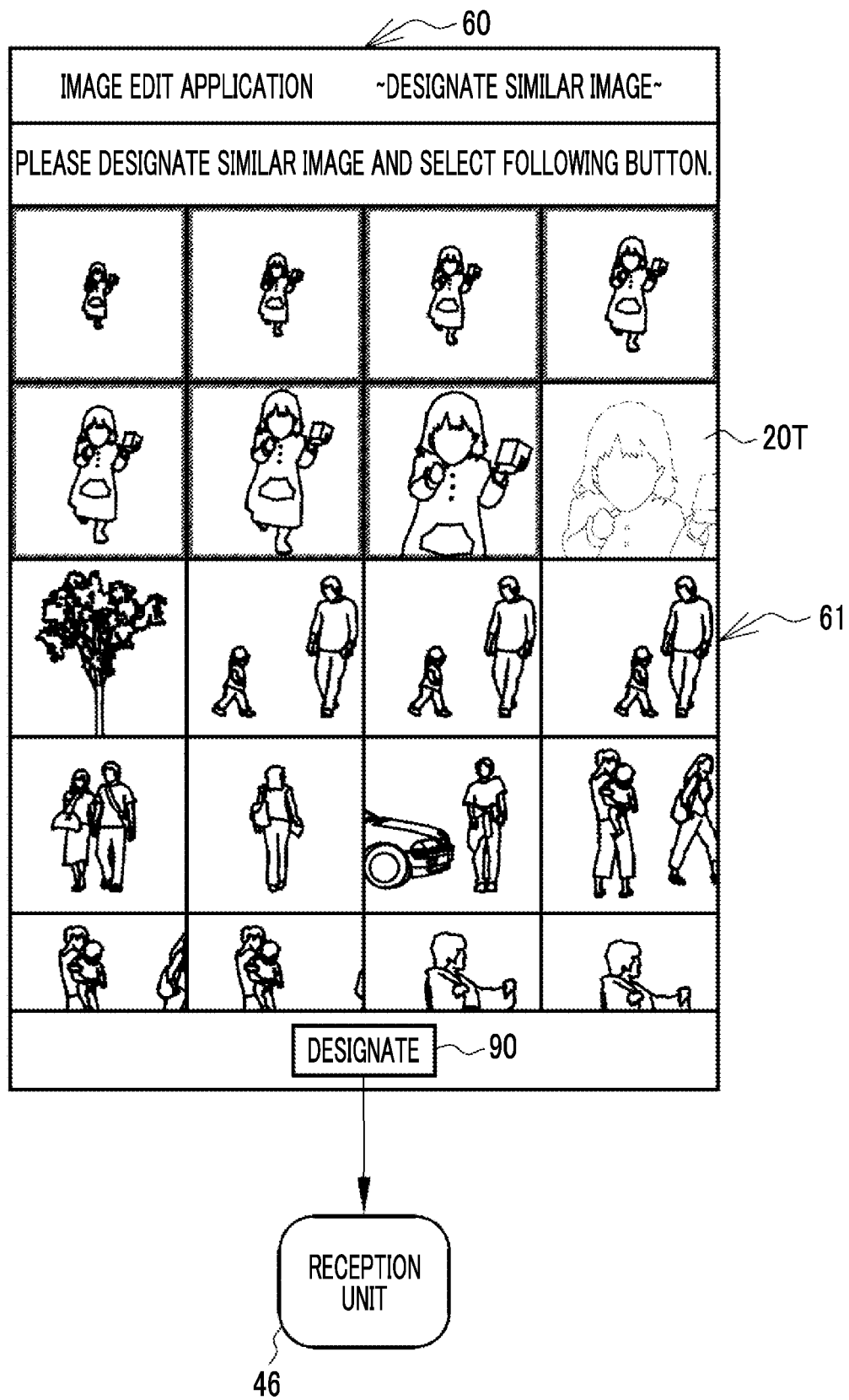
FIG. 20 is a diagram showing how a reception unit receives designation of a similar image by a user.

In a fourth exemplary embodiment shown in FIG. 20, the reception unit 46 receives designation of the similar image 20S by the user 12.

The image display screen 60 shown in FIG. 20 is the same as that shown in (A) of FIG. 5 in that the list 61 is displayed. The difference from the image display screen 60 shown in (A) of FIG. 5 is that a message indicating that the similar image 20S is designated is displayed at the top, a designation button 90 is disposed at the bottom, and the target image 20T is grayed out. The control unit 48 displays the image display screen 60 shown in FIG. 20 on the display 34 after the first processing on the target image 20T-B is ended (after step ST140 shown in FIG. 16).

As indicated by hatching, the similar image 20S in the list 61 is designated by a tap operation of the user 12. Then, the designation button 90 is selected. In a case where the designation button 90 is selected, an image designated on the image display screen 60 at that time is received as the similar image 20S by the reception unit 46.

As described above, in the fourth exemplary embodiment, the reception unit 46 receives designation of the similar image 20S by the user 12. Therefore, an image visually recognized and determined by the user 12 is set as the similar image 20S. In a case where only the fourth exemplary embodiment is implemented, the subject extraction unit 50 and the image extraction unit 51 are not required.

Each of the exemplary embodiments described above and the fourth exemplary embodiment may be implemented in combination. For example, in the list 61 of the image display screen 60, the similar image 20S extracted by the image extraction unit 51 may be displayed for the user 12 by surrounding the similar image 20S with a frame, so that the designation of the similar image 20S by the user 12 is received. The user 12 determines whether or not the similar image 20S extracted by the image extraction unit 51 is appropriate by visual recognition on the image display screen 60. Then, in a case where the similar image 20S extracted by the image extraction unit 51 is not appropriate, the designation of the similar image 20S is removed.

Alternatively, one of the method of extracting an image including the major subject MS as the similar image 20S in the first exemplary embodiment, the method of extracting the similar image 20S based on the imaging interval with respect to the target image 20T in the third exemplary embodiment, or the method of receiving the designation of the similar image 20S by the user 12 in the fourth exemplary embodiment may be able to be selected by the user 12 in order to specify the similar image 20S.

Fifth Exemplary Embodiment

Figure 21:
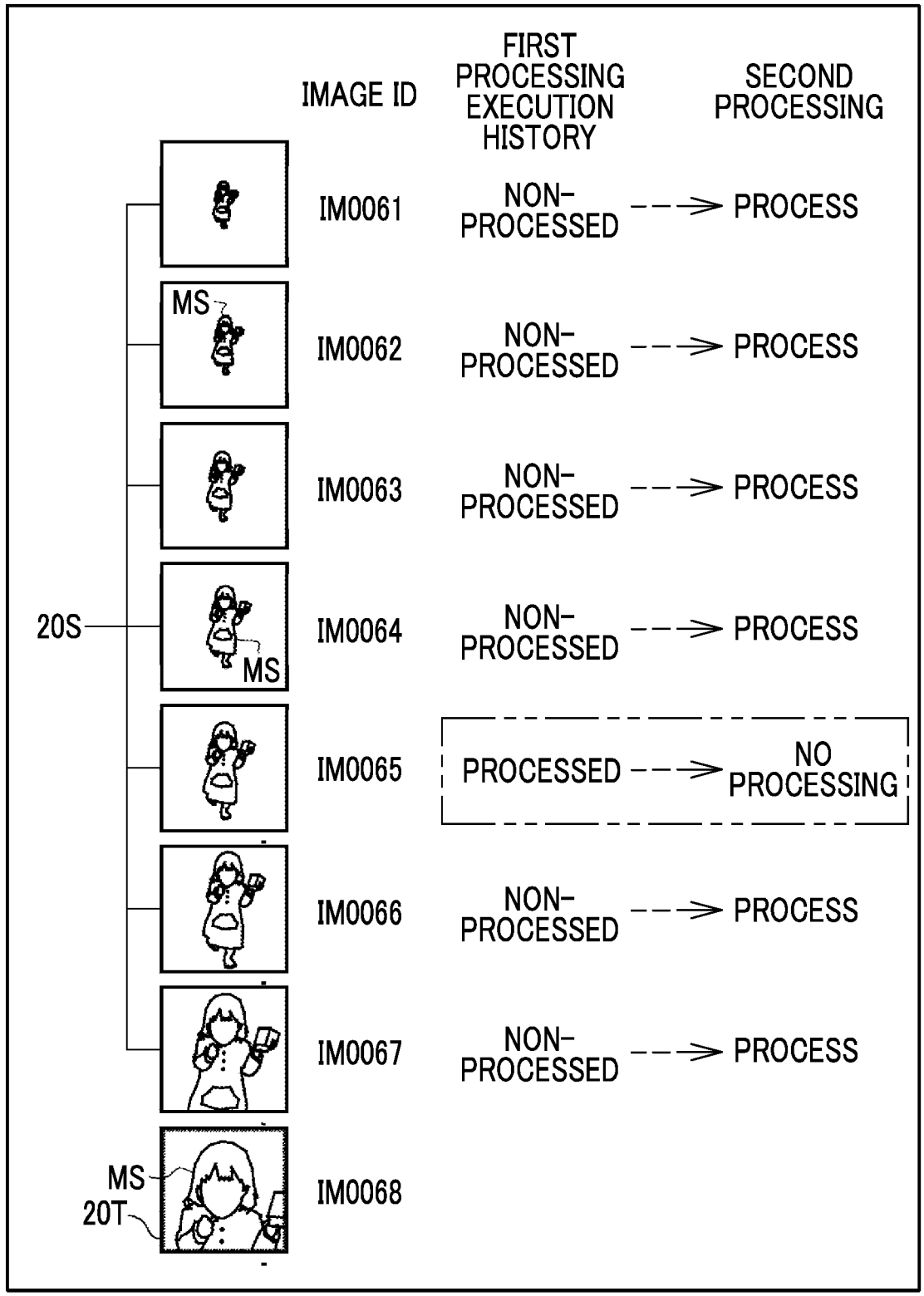
FIG. 21 is a diagram showing a fifth exemplary embodiment in which the second processing is not executed on a similar image on which the first processing has already been executed.

In a fifth exemplary embodiment shown in FIG. 21, the control unit 48 does not cause the processing unit 47 to execute the second processing on the similar image 20S on which the first processing has already been executed.

The control unit 48 determines whether or not the first processing has already been executed with reference to the execution history information 41 that is the execution history of the first processing. Specifically, in a case where an image extracted as the similar image 20S is registered in the execution history information 41, the control unit 48 determines that the first processing has already been executed on the image. On the other hand, in a case where an image extracted as the similar image 20S is not registered in the execution history information 41, the control unit 48 determines that the first processing has not been executed on the image.

As in FIG. 14, FIG. 21 illustrates the target image 20T which has an image ID of IM0068 and in which a little girl appears as the major subject MS. In addition, as in FIG. 14, FIG. 21 illustrates a case where images having image IDs of IM0061 to IM0067 are extracted as the similar images 20S. Then, FIG. 21 illustrates a case where the similar image 20S having an image ID of IM0065 has already been subjected to the first processing before the target image 20T having an image ID of IM0068. In this case, the control unit 48 does not cause the processing unit 47 to execute the second processing on the similar image 20S having an image ID of IM0065.

For example, a case is considered in which the image effect A is executed as the first processing on the similar image 20S having an image ID of IM0065 and the image effect B is executed as the first processing on the target image 20T having an image ID of IM0068. In this case, the control unit 48 causes the processing unit 47 to execute the image effect B as the second processing on the similar image 20S other than the similar image 20S having an image ID of IM0065. On the other hand, for the similar image 20S having an image ID of IM0065, the image effect B is not executed by the processing unit 47, and the image effect A is applied.

As described above, in the fifth exemplary embodiment, the control unit 48 does not cause the processing unit 47 to execute the second processing on the similar image 20S on which the first processing has already been executed. Therefore, the content of the first processing instructed by the user 12 is respected.

As exemplified by the tree S11 in FIG. 17 and the like, the subject is not limited to a person. In addition to the tree, natural objects such as flowers, mountains, rivers, and lakes, animals, insects, and artifacts such as buildings, chairs, desks, and beds may be used.

The major subject MS is not limited to one subject. For example, a plurality of subjects may be extracted as the major subjects MS, such as extracting a subject having the highest score and a subject having the second highest score as the major subjects MS. In this case, for example, in a case where three persons are extracted as the major subjects MS, not only an image in which the three persons appear but also an image in which two persons among the three persons appear may be extracted as the similar images 20S by the image extraction unit 51.

Instead of or in addition to the methods of extracting the similar image 20S in the first, third, and fourth exemplary embodiments, a method of extracting the similar image 20S based on position information acquired by a global positioning system (GPS) or the like may be used. For example, an image whose imaging location indicated by the position information is within the set range is extracted as the similar image 20S.

A GUI for canceling the second processing with one touch may be provided on the image display screen 60. In this manner, it is possible to easily return to the state before the second processing in a case where the extraction accuracy of the similar image 20S is relatively low or a case where the user 12 considers that the second processing is not required.

An image may be stored in the storage device 30 of the mobile terminal 10 instead of storing and managing the image in the image management server 11. In this case, the image transmission and reception unit 45 is not required.

The image processing apparatus is not limited to the mobile terminal 10 exemplified in each of the exemplary embodiments described above. The image processing program 40 may be installed on a desktop type personal computer, and the desktop type personal computer may be operated as an image processing apparatus. However, in the case of the desktop type personal computer, there is no operation corresponding to the pinch-out operation and the pinch-in operation in the mobile terminal 10. Therefore, in a case where the desktop type personal computer is made to operate as an image processing apparatus, scoring based on the operation point of the enlargement instruction and scoring based on the operation point of the reduction instruction are not performed.

The image processing program 40 may be installed on a server on the WAN 13 including the image management server 11, and the server on the WAN 13 may be operated as an image processing apparatus. In this case, the mobile terminal 10 transmits an instruction to select the target image 20T or an instruction relevant to the first processing to a server (hereinafter, referred to as an image editing server) that operates as an image processing apparatus. The image editing server transmits the image display screen 60 in the form of screen data that can be viewed on the web browser of the mobile terminal 10. The mobile terminal 10 receives the screen data of the image display screen 60 from the image editing server, reproduces the image display screen 60 to be displayed on the web browser based on the received screen data, and displays the image display screen 60 on the display 34. More specifically, the image editing server transmits the image display screen 60 in the form of screen data for web distribution created in a markup language, such as extensible markup language (XML), for example. Instead of the XML, other data description languages such as JavaScript (registered trademark) object notation (JSON) may be used.

Various modifications of the hardware configuration of a computer configuring the image editing server can be made. For example, the image editing server can be configured by a plurality of server computers separated as hardware for the purpose of improving processing capability or reliability. Specifically, the functions of the reception unit 46, the processing unit 47, and the control unit 48 and the functions of the management unit 49, the subject extraction unit 50, and the image extraction unit 51 are dispersed to two server computers. In this case, two server computers configure the image editing server.

In this manner, the hardware configuration of the computer can be appropriately changed according to the required performance, such as processing capability, safety, and reliability. Without being limited to the hardware, it is needless to say that application programs, such as the image processing program 40, can be duplicated or can be stored in a plurality of storage devices in a dispersed manner for the purpose of securing safety or reliability.

In each of the exemplary embodiments described above, for example, various processors described below can be used as a hardware structure of processing units that execute various kinds of processing, such as the image transmission and reception unit 45, the reception unit 46, the processing unit 47, the control unit 48, the management unit 49, the subject extraction unit 50, and the image extraction unit 51. As described above, the various processors include a CPU that is a general-purpose processor that executes software (image processing program 40) to function as various processing units, a programmable logic device (PLD) that is a processor whose circuit configuration can be changed after manufacture, such as a field programmable gate array (FPGA), a dedicated electric circuit that is a processor having a circuit configuration designed exclusively to execute specific processing, such as an application specific integrated circuit (ASIC), and the like.

One processing unit may be configured by one of these various processors, or may be configured by a combination of two or more processors of the same type or different types (for example, a combination of a plurality of FPGAs or a combination of a CPU and an FPGA). A plurality of processing units may be configured by one processor.

As an example of configuring a plurality of processing units by one processor, first, as represented by computers such as a client and a server, there is a form in which one processor is configured by a combination of one or more CPUs and software and the processor functions as a plurality of processing units. Second, as represented by a system on chip (SoC), there is a form of using a processor that realizes the function of the entire system including a plurality of processing units with one integrated circuit (IC) chip. As described above, the various processing units are configured using one or more of the above-described various processors as a hardware structure.

More specifically, an electric circuit (circuitry) in which circuit elements, such as semiconductor elements, are combined can be used as a hardware structure of the various processors.

From the above description, the invention described in the following appendix 1 can be grasped.

APPENDIX 1

An image processing apparatus including: a processing processor that performs image processing on an image; and a control processor that controls the processing processor to execute first processing on a target image of the first processing instructed by a user and controls the processing processor to execute second processing corresponding to the first processing on a similar image that is similar to the target image.

As the technique of the present disclosure, the above-described various exemplary embodiments and various modification examples can be appropriately combined. The present disclosure is not limited to each of the exemplary embodiments described above, and it is needless to say that various configurations can be adopted without departing from the gist.

The technique of the present disclosure extends to a storage medium storing a program in addition to a program. Specifically, an application program such as the image processing program 40 is not limited to the form stored in the storage device 30 as in the exemplary embodiments described above. The image processing program 40 may be provided in a form stored in a computer readable storage medium. Examples of the storage medium include optical discs, such as a compact disk read only memory (CD-ROM) and a digital versatile disk read only memory (DVD-ROM), and semiconductor memories, such as a universal serial bus (USB) memory and a memory card. The image processing program 40 may be acquired from an external apparatus through a communication line, such as the WAN 13 connected to the communication unit 33.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing an image processing program causing a computer comprising a processor to perform functions comprising:
   performing image processing on an image; and
   executing a first processing on a target image of the first processing instructed by a user;
   executing a second processing corresponding to the first processing on a similar image that is similar to the target image, wherein the first processing and the second processing are identical processings;
   managing an execution history of the first processing, and not executing the second processing on the similar image, on which the first processing has already been executed, with reference to the execution history.

2. The non-transitory computer readable medium storing an image processing program according to claim 1, wherein the image processing program causing a computer comprising the processor to further perform:
   extracting the similar image.

3. The non-transitory computer readable medium storing an image processing program according to claim 2, wherein the image processing program causing a computer comprising the processor to further perform:
   extracting a major subject from the target image, and
   extracting an image including the major subject as the similar image.

4. The non-transitory computer readable medium storing an image processing program according to claim 3, wherein the image processing program causing a computer comprising the processor to further perform:
   extracting a series of images, which are images having consecutive imaging dates and times with respect to the target image and including the major subject and among the series of images, a first image and a last image of the series of images are arranged immediately next to images not including the major subject, as the similar images.

5. The non-transitory computer readable medium storing an image processing program according to claim 3, wherein the image processing program causing a computer comprising the processor to further perform:
   extracting the major subject based on at least one of an operation history of an instruction relevant to the first processing of the user or the target image before and after the first processing.

6. The non-transitory computer readable medium storing an image processing program according to claim 4, wherein the image processing program causing a computer comprising the processor to further perform:

extracting the major subject based on at least one of an operation history of an instruction relevant to the first processing of the user or the target image after the first processing.

7. The non-transitory computer readable medium storing an image processing program according to claim 5, wherein the image processing program causing a computer comprising the processor to further perform:
extracting the major subject based on at least one of a degree of reflection of each subject in the target image after the first processing or a distance between the subject and an operation point of the user on the target image in the operation history.

8. The non-transitory computer readable medium storing an image processing program according to claim 6, wherein the image processing program causing a computer comprising the processor to further perform:
extracting the major subject based on at least one of a degree of reflection of each subject in the target image after the first processing or a distance between the subject and an operation point of the user on the target image in the operation history.

9. The non-transitory computer readable medium storing an image processing program according to claim 7,
wherein the degree of reflection is at least one of a proportion, a part, or a position of the subject included in the target image after the first processing.

10. The non-transitory computer readable medium storing an image processing program according to claim 8,
wherein the degree of reflection is at least one of a proportion, a part, or a position of the subject included in the target image after the first processing.

11. The non-transitory computer readable medium storing an image processing program according to claim 3,
wherein the second processing is processing in which at least one of a position or a size of the major subject in the similar image after the second processing is the same as that in the target image after the first processing.

12. The non-transitory computer readable medium storing an image processing program according to claim 4,
wherein the second processing is processing in which at least one of a position or a size of the major subject in the similar image after the second processing is the same as that in the target image after the first processing.

13. The non-transitory computer readable medium storing an image processing program according to claim 5,
wherein the second processing is processing in which at least one of a position or a size of the major subject in the similar image after the second processing is the same as that in the target image after the first processing.

14. The non-transitory computer readable medium storing an image processing program according to claim 3, wherein the image processing program causing a computer comprising the processor to further perform:
extracting an exclusion target subject, which is a subject to be excluded, from the target image, and
the second processing includes processing for excluding the exclusion target subject from the similar image.

15. The non-transitory computer readable medium storing an image processing program according to claim 2, wherein the image processing program causing a computer comprising the processor to further perform:
extracting the similar image based on an imaging interval with respect to the target image.

16. The non-transitory computer readable medium storing an image processing program according to claim 15, wherein the image processing program causing a computer comprising the processor to further perform:
extracting a series of images, which are images having consecutive imaging dates and times with respect to the target image and among the series of images, a first image of the series of images is arranged immediately after an image whose imaging interval with respect to the first image is longer than a set interval and the last image of the series of images is arranged immediately before an image whose imaging interval with respect to the last image is longer than the set interval, as the similar images.

17. The non-transitory computer readable medium storing an image processing program according to claim 1, wherein the image processing program causing a computer comprising the processor to further perform:
receiving a designation of the similar image by the user.

18. An image processing apparatus, comprising:
a non-transitory storage medium; and
a processor coupled to the non-transitory storage medium and configured at least to:
performing an image processing on an image;
executing a first processing on a target image of the first processing instructed by a user and executing a second processing corresponding to the first processing on a similar image that is similar to the target image, wherein the first processing and the second processing are identical processings;
managing an execution history of the first processing; and
not executing the second processing on the similar image, on which the first processing has already been executed, with reference to the execution history.

19. A non-transitory computer readable medium storing a program causing a computer to realize:
a function of extracting a similar image, which is similar to a target image, according to an operation of a user on the target image;
a function of executing processing, which is the same as executing a first processing on the target image of the first processing instructed by a user and executing a second processing corresponding to the first processing on a similar image that is similar to the target image, wherein the first processing and the second processing are identical processings;
a function of managing an execution history of the first processing, and
a function of not executing the second processing on the similar image, on which the first processing has already been executed, with reference to the execution history.

* * * * *